US012619334B2

(12) United States Patent
Youm

(10) Patent No.: US 12,619,334 B2
(45) Date of Patent: May 5, 2026

(54) ELECTRONIC DEVICE AND METHOD FOR EXECUTING DESIGNATED FUNCTION ACCORDING TO CONTACT OF EXTERNAL OBJECT

(71) Applicant: SAMSUNG ELECTRONICS CO., LTD., Suwon-si (KR)

(72) Inventor: Sangbum Youm, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/967,078

(22) Filed: Dec. 3, 2024

(65) Prior Publication Data

US 2025/0094001 A1 Mar. 20, 2025

Related U.S. Application Data

(63) Continuation of application No. PCT/KR2023/005832, filed on Apr. 27, 2023.

(30) Foreign Application Priority Data

Jun. 22, 2022 (KR) ........................ 10-2022-0076483
Jul. 14, 2022 (KR) ........................ 10-2022-0087223

(51) Int. Cl.
G06F 3/042 (2006.01)
G06F 1/16 (2006.01)
G06F 3/02 (2006.01)

(52) U.S. Cl.
CPC ............ *G06F 3/042* (2013.01); *G06F 1/1662* (2013.01); *G06F 3/02* (2013.01)

(58) Field of Classification Search
CPC ........... G06F 3/042; G06F 1/1662; G06F 3/02
See application file for complete search history.

(56) References Cited

U.S. PATENT DOCUMENTS 7,119,795 B2 10/2006 Rekimoto
8,077,057 B2 12/2011 Ohshita et al.
(Continued)

FOREIGN PATENT DOCUMENTS

JP H103338 A 1/1998
JP 2001016635 A 1/2001
(Continued)

OTHER PUBLICATIONS

International Search Report and Written Opinion for International Application No. PCT/KR2023/005832; International Filing Date Apr. 27, 2023; International Search Report Mail Date Jun. 22, 2022; 67 Pages.

*Primary Examiner* — Afroza Chowdhury
(74) *Attorney, Agent, or Firm* — CANTOR COLBURN LLP

(57) ABSTRACT

An electronic device, according to one embodiment, may receive an input for a first button from among a plurality of buttons. The electronic device may execute, in response to the input, a first function from among a plurality of functions assigned to the first button, while being in a first state in which an external object contacting at least some region of a housing is identified on the basis of a sensor. The electronic device may execute, in response to the input, a second function from among the plurality of functions assigned to a combination of the first button and a second button different from the first button from among the plurality of buttons, while being in a second state in which release of the external object is identified on the basis of the sensor, the second state being different from the first state.

20 Claims, 13 Drawing Sheets

(56) References Cited

U.S. PATENT DOCUMENTS

| | | | |
|---|---|---|---|
| 8,743,058 B2 | 6/2014 | Zhu | |
| 8,791,921 B2 | 7/2014 | Westerman | |
| 8,928,611 B2 | 1/2015 | Fujii | |
| 9,552,068 B2 | 1/2017 | Aubauer et al. | |
| 10,817,109 B2 | 10/2020 | Roberts-Hoffman et al. | |
| 11,379,060 B2 | 7/2022 | Hotelling et al. | |
| 2004/0104895 A1* | 6/2004 | Rekimoto | G06F 3/03547 |
| | | | 345/168 |
| 2006/0132447 A1* | 6/2006 | Conrad | G06F 3/0219 |
| | | | 345/168 |
| 2008/0266143 A1* | 10/2008 | Ohshita | G06F 3/041 |
| | | | 341/22 |
| 2011/0285653 A1* | 11/2011 | Kojima | G06F 3/04883 |
| | | | 345/173 |
| 2014/0055370 A1* | 2/2014 | Fujii | G06F 3/0219 |
| | | | 345/173 |
| 2014/0327621 A1* | 11/2014 | Faggin | G06F 3/0227 |
| | | | 345/168 |
| 2018/0067571 A1* | 3/2018 | Hotelling | G06F 3/04886 |
| 2019/0258298 A1* | 8/2019 | Arima | G06F 3/0393 |
| 2019/0361543 A1* | 11/2019 | Zhang | G06F 1/1684 |
| 2021/0389848 A1 | 12/2021 | Forstall et al. | |

FOREIGN PATENT DOCUMENTS

| | | | |
|---|---|---|---|
| JP | 2004086365 A | 3/2004 | |
| JP | 2007220003 A | 8/2007 | |
| JP | 2008004000 A | 1/2008 | |
| JP | 2008117212 A | 5/2008 | |
| JP | 2010257198 A | 11/2010 | |
| JP | 2014052864 A | 3/2014 | |
| JP | 2014085963 A | 5/2014 | |
| JP | WO2013076858 A1 | 4/2015 | |
| JP | 2019101876 A | 6/2019 | |
| JP | 6705033 B1 | 6/2020 | |
| KR | 100887093 B1 | 3/2009 | |
| KR | 20110085522 A | 7/2011 | |
| KR | 20120104163 A | 9/2012 | |
| KR | 101511778 B1 | 4/2015 | |
| KR | 102197912 B1 | 1/2021 | |
| KR | 102253626 B1 | 5/2021 | |

* cited by examiner

ELECTRONIC DEVICE AND METHOD FOR EXECUTING DESIGNATED FUNCTION ACCORDING TO CONTACT OF EXTERNAL OBJECT

CROSS-REFERENCE TO RELATED APPLICATIONS

This application is a continuation of International Application No. PCT/KR2023/005832, designating the United States, filed on Apr. 27, 2023, in the Korean Intellectual Property Receiving Office and claiming priority to Korean Patent Application No. 10-2022-0087223 filed on Jul. 14, 2022 in the Korean Intellectual Property Receiving Office and to Korean Patent Application No. 10-2022-0076483 filed on Jun. 22, 2022, in the Korean Intellectual Property Receiving Office, the disclosures of each of which are incorporated by reference herein in their entireties.

BACKGROUND

Field

Various embodiments relate to an electronic device and a method for executing a designated function according to a contact of an external object.

Description of Related Art

An electronic device may include a plurality of buttons. The electronic device may selectively execute functions assigned to the plurality of buttons based on an input with respect to at least one of the plurality of buttons. For example, based on a gesture of pressing each of the plurality of buttons, the electronic device may execute any one of the different functions assigned to each of the plurality of buttons.

SUMMARY

According to an embodiment, an electronic device may comprise a plurality of buttons, a housing including a first area where the plurality of buttons are exposed to an outside, a sensor to identify an external object being contacted on a second area different from the first area of the housing, memory to store instructions, and at least one processor operably coupled to the plurality of buttons, the sensor, and the memory. The at least one processor, when the instructions are executed, may be configured to receive an input with respect to a first button among the plurality of buttons. The at least one processor, when the instructions are executed, may be configured to, in response to the input in a first state identifying the external object being contacted on the second area based on the sensor, execute a first function among a plurality of functions assigned to the first button. The at least one processor, when the instructions are executed, may be configured to, in response to the input in a second state, that is different from the first state, identifying a release of the external object based on the sensor, execute a second function included in the plurality of functions assigned to a combination of the first button and a second button different from the first button among the plurality of buttons.

According to an embodiment, a method of an electronic device may comprise receiving an input with respect to a first button among a plurality of buttons included in a first area that is exposed to an outside of a housing. The method of the electronic device may comprise, in response to the input in a first state identifying an external object being contacted on a second area based on a sensor to identify the external object being contacted on the second area different from the first area of the housing, executing a first function among a plurality of functions assigned to the first button. The method of the electronic device may comprise, in response to the input in a second state, that is different from the first state, identifying a release of the external object based on the sensor, executing a second function included in the plurality of functions assigned to a combination of the first button and a second button different from the first button among the plurality of buttons.

According to an embodiment, an electronic device may comprise a first display included in a first housing, a second display included in a second housing different from the first housing, a sensor to identify an external object on at least a partial area of the first housing, memory to store instructions, and at least one processor operably coupled to the first display, the second display, the sensor, and the memory. The at least one processor, when the instructions are executed, may be configured to display a keyboard in a first area of the first display. The at least one processor, when the instructions are executed, may be configured to receive an input with respect to a first button among a plurality of buttons included in the keyboard. The at least one processor, when the instructions are executed, may be configured to, in response to the input in a first state identifying the external object being contacted on a second area, which is at least a partial area of the housing based on the sensor, execute a first function among a plurality of functions assigned to the first button. The at least one processor, when the instructions are executed, may be configured to, in response to the input in a second state, that is different from the first state, identifying a release of the external object based on the sensor, execute a second function included in the plurality of functions assigned to a combination of the first button and a second button different from the first button among the plurality of buttons.

According to an embodiment, a method of an electronic device may comprise displaying a keyboard in a first area of a display included in a housing. The method of the electronic device may comprise receiving an input with respect to a first button among a plurality of buttons included in the keyboard. The method of the electronic device may comprise, in response to the input in a first state identifying an external object being contacted on a second area, which is at least a partial area of the housing, based on a sensor to identify the external object on the second area, executing a first function among a plurality of functions assigned to the first button. The method of the electronic device may comprise, in response to the input in a second state, that is different from the first state, identifying a release of the external object based on the sensor, executing a second function included in the plurality of functions assigned to a combination of the first button and a second button different from the first button among the plurality of buttons.

DETAILED DESCRIPTION

Figure 1:
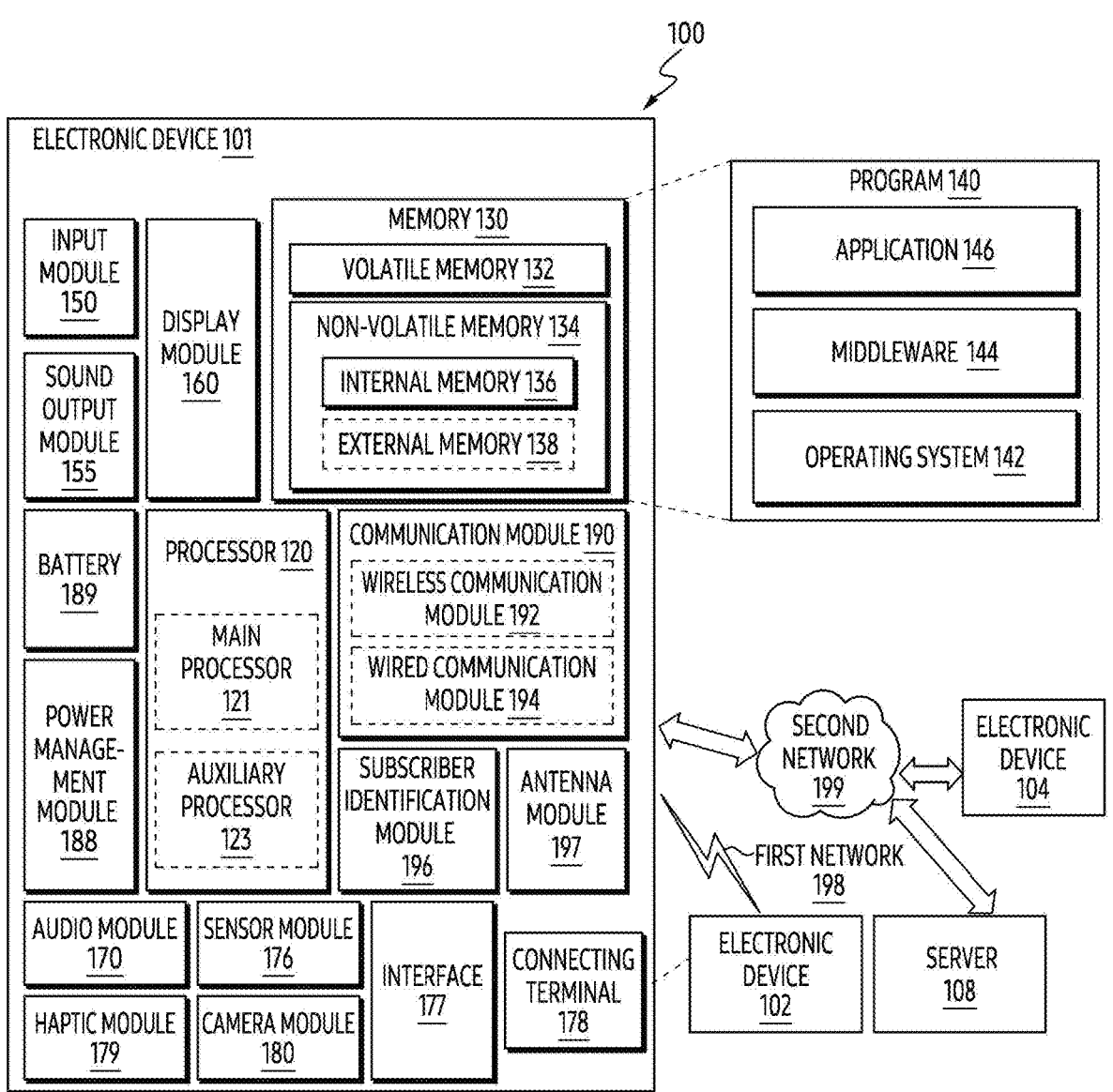
FIG. 1 is a block diagram of an electronic device in a network environment according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
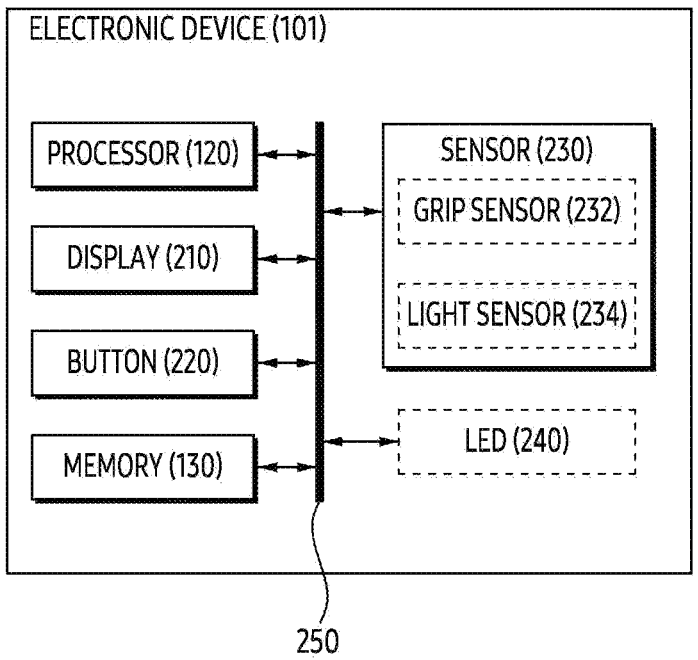
FIG. 2 illustrates a block diagram of an exemplary electronic device according to an embodiment.

FIG. 2 illustrates a block diagram of an exemplary electronic device according to an embodiment. An electronic device 101 of FIG. 2 may be an example of the electronic device 101 of FIG. 1. A processor 120 of FIG. 2 may be an example of the processor 120 of FIG. 1. Memory 130 of FIG. 2 may be an example of the memory 130 of FIG. 1. For example, the electronic device 101 may include a notebook computer (or laptop computer), a convertible personal computer (PC), a portable personal computer (PC), a tablet personal computer (PC), and/or a dual screen foldable personal computer (PC). However, it is not limited thereto.

Referring to FIG. 2, according to an embodiment, the electronic device 101 may include at least one of the processor 120, a display 210, a button 220, the memory 130, a sensor 230, or a light emitting diode (LED) 240. The processor 120, the display 210, the button 220, the memory 130, the sensor 230, and the LED 240 may be electronically and/or operably coupled with each other by an electronic component such as a communication bus 250. Although illustrated based on different blocks, an embodiment is not limited thereto. For example, a portion (e.g., at least a portion of the processor 120, the display 210, the button 220, the memory 130, the sensor 230, and/or the LED 240) of a hardware component illustrated in FIG. 2 may be included in a single integrated circuit, such as a system on a chip (SoC). The sensor 230 may include a grip sensor 232 and/or a light sensor 234. A type and/or the number of the hardware components included in the electronic device 101 is not limited as illustrated in FIG. 2. For example, the electronic device 101 may include only a portion of the hardware components illustrated in FIG. 2. According to an embodiment, the electronic device 101 may omit the LED 240. The button 220, the sensor 230, and/or the LED 240 may be illustrated in the singular, but may be plural.

According to an embodiment, the processor 120 of the electronic device 101 may correspond to at least a portion of the processor 120 of FIG. 1. According to an embodiment, the processor 120 may include a hardware component for processing data based on one or more instructions. The hardware component for processing data may include, for example, an arithmetic and logic unit (ALU), a floating point unit (FPU), a field programmable gate array (FPGA), an application processor (AP), a micro-computer (Micom, and/ or micom controller), and/or a central processing unit (CPU). The number of processors 120 may be one or more. For example, the processor 120 may have a structure of a multi-core processor such as a dual core, a quad core, or a hexa core. For example, the processor 120 may have a structure of a single core processor such as a single core.

According to an embodiment, the processor 120 may execute a function assigned to the button 220. For example, the processor 120 may execute at least one of a plurality of functions assigned to the button 220 based on an input with respect to the button 220. In an embodiment, functions exceeding the number of a plurality of buttons may be assigned to the plurality of buttons, in order to execute various functions of the electronic device. In order to assign the functions to the plurality of buttons, according to an embodiment, the electronic device may support execution of a function based on a gesture of simultaneously pressing at least two of the plurality of buttons. The gesture of simultaneously pressing at least two buttons may include, for example, a gesture of simultaneously pressing a designated key such as a shift key, and a key different from the designated key. In order to minimize movement of an external object (e.g., at least one of both hands) caused by the gesture, according to an embodiment, the electronic device may execute a function assigned to the gesture based on a contact between the external object and a housing of the electronic device.

According to an embodiment, the display 210 may display a screen based on information transmitted from the processor 120. For example, the display 210 may display, based on a state of the electronic device 101, a pop-up for indicating the state of the electronic device. The state may be defined based on the sensor 230 to be described later. The screen displayed by the display 210 will be described with reference to FIG. 6.

According to an embodiment, the electronic device 101 may include a first housing and a second housing. For example, the first housing may include the display 210 (or a flexible display). For example, the first housing and/or the second housing may include the LED 240. For example, the second housing may include various circuits for an operation of the electronic device 101. For example, a plurality of buttons 220 may be exposed to an outside of the second housing. The second housing may include a first area in which the plurality of buttons 220 are exposed to the outside. The second housing may include a second area and a third area in which an external object is contacted. For example, the second housing may include a palm rest.

According to an embodiment, the electronic device 101 may include the button 220. The number of the button 220 included in the electronic device 101 may be one or more. A plurality of buttons including the button 220 may be exposed to the outside on a surface of the housing of the electronic device 101. A plurality of buttons positioned on the surface may be referred to as a keyboard. According to an embodiment, the button 220 may include the button 220 displayed on the display 210. For example, the button 220 may include a soft keyboard and/or a virtual keyboard (hereinafter, a soft keyboard) displayed on the display 210. A description of an operation based on the button 220 displayed on the display 210 will be described with reference to FIGS. 7A to 7C.

According to an embodiment, the button 220 may be inputted based on a pressing gesture of an external object. For example, the button 220 may be inputted based on pressing of the external object in a state of being exposed to the outside. A processor may execute a function assigned to the button 220 based on the input. For example, the function assigned to the button 220 may include an operation of executing a key matching the button 220, an operation of adjusting brightness of a screen, an operation of controlling volume of a sound, and/or an operation of switching the screen. However, it is not limited thereto.

According to an embodiment, the soft keyboard may be displayed on the display 210. The soft keyboard may transmit a signal for an input to the processor based on an input (e.g., a gesture of touching a button) with respect to a button displayed on the display 210. However, it is not limited thereto.

According to an embodiment, the electronic device 101 may assign a function to a combination of a first button, and a second button (e.g., an fn key, a shift key, a control key, and an alt key) to which a function is not independently assigned, among the plurality of buttons including the button 220. The first button may be a button to which an independent function is assigned. The first button may be a button to which a plurality of functions are assigned. For example, the first button may include a button included in a normal character string displayed on the keyboard. For example, the first button may include a key indicating an English lowercase letter, such as an i key, and/or a key indicating a number 0. However, it is not limited thereto. For example, a fn key, which is one of the second buttons, may be executed by combining with the first button. For example, the fn key may have a function of adjusting the brightness of the screen by combining with a f1 key. However, it is not limited thereto.

According to an embodiment, the electronic device 101 may execute one of the functions in a designated state. A designated state may be defined based on the sensor 230. The designated state may include several cases in which an external object is identified based on the sensor 230 included in the electronic device 101. For example, a first state among the designated state may be a state identifying a contact of the external object based on a first sensor. For example, a second state among the designated state may be a state identifying a release of the contact of the external object based on the first sensor. For example, a third state among the designated state may be a state identifying the contact of the external object based on a second sensor. For example, a fourth state among the designated state may be a state identifying the release of the contact of the external object based on the second sensor. The designated state will be described with reference to FIG. 3B, and FIGS. 4A to 4C.

According to an embodiment, the electronic device 101 may include the memory 130. The memory 130 may correspond to the memory 130 of FIG. 1. For example, the memory 130 may store instructions that cause an operation of the electronic device 101. For example, the processor 120 may cause the operation of the electronic device 101 when executing instructions stored in the memory 130.

According to an embodiment, the electronic device 101 may include the sensor 230. For example, the sensor 230 may be configured with at least one sensor. For example, the processor 120 may identify an external object on the electronic device 101 based on data obtained through the sensor 230. For example, the processor 120 may identify a release of the external object on the electronic device 101 based on data obtained through the sensor 230. For example, the processor 120 may identify an external object on the second area of the second housing based on the sensor 230. The processor 120 may identify a release of the external object on the second area of the second housing based on the sensor 230. For example, the processor 120 may identify an external object on the third area of the second housing based on the sensor 230. The processor 120 may identify a release of the external object on the third area of the second housing based on the sensor 230. According to an embodiment, the sensor 230 may include the grip sensor 232 and/or the light sensor 234. The sensor 230, the grip sensor 232, and/or the light sensor 234 may be illustrated in the singular, but may be plural.

According to an embodiment, the processor 120 may identify (or detect) an external object based on the grip sensor 232. The processor 120 may identify a state identifying the external object based on the grip sensor 232. The processor 120 may execute a function assigned to the button 220 based on an input with respect to the button 220 in the state identifying the external object. According to an embodiment, the processor 120 may identify (or detect) a release of the external object based on the grip sensor 232. The processor 120 may identify a state identifying (or detecting) the release of the external object based on the grip sensor 232. The processor 120 may execute the function assigned to the button 220 in response to the input with respect to the button 220 in a state identifying a contact of the external object based on the grip sensor 232.

According to an embodiment, the processor 120 may identify (or detect) an external object based on the light sensor 234. The processor 120 may identify a state identifying the external object based on the light sensor 234. The processor 120 may execute the function assigned to the button 220 based on the input with respect to the button 220 in the state identifying the external object. According to an embodiment, the processor 120 may identify (or detect) a release of the external object based on the light sensor 234. The processor 120 may identify the state identifying (or detecting) the release of the external object based on the light sensor 234. The processor 120 may execute the function assigned to the button 220 in response to the input with respect to the button 220 in a state identifying a contact of the external object based on the light sensor 234.

According to an embodiment, the grip sensor 232 may be included to control an electromagnetic wave (e.g., a wireless signal) capable of affecting a user when conducting wireless communication. The grip sensor 232 may include a magnetic proximity sensor, an optical proximity sensor, an ultrasonic proximity sensor, an inductive proximity sensor, a capacitive sensor, and/or an eddy current sensor. However, it is not limited thereto. As described above, the electronic device 101 according to an embodiment may identify one of a plurality of states by using the grip sensor 232 for adjusting the electromagnetic wave. For example, the electronic device 101 may operate based on the grip sensor 232 to satisfy regulations on absorption of the electromagnetic wave in a human body, such as a specific absorption rate (SAR). The electronic device 101 may execute one of a plurality of functions in one of the plurality of states based on identifying one of the plurality of states.

According to an embodiment, the electronic device 101 may include the LED 240. Activation of the LED 240 may be adjusted based on data obtained by sensor 230. For example, the processor 120 may deactivate a first LED, which is one of the LED 240, in a state of identifying the external object being contacted on the second area of the second housing based on the sensor 230. For example, the processor 120 may deactivate a second LED, which is different from the first LED, in a state of identifying the external object being contacted on the third area of the second housing based on the sensor 230. For example, the processor 120 may activate the first LED in a state of identifying of a release of the external object being contacted on the second area based on the sensor 230. The processor 120 may activate the second LED in a state identifying of the release of the external object being contacted on the third area. As described above, the electronic device 101 according to an embodiment may provide a state to the user of the electronic device 101 through the LED 240. The electronic device 101 including the LED 240 will be described with reference to FIG. 5. According to an embodiment, the electronic device 101 may omit the grip sensor 232, the light sensor 234, and/or the LED 240.

As described above, according to an embodiment, the electronic device 101, in response to the input with respect to the button 220 in the state identifying the external object based on the sensor 230, may execute a function assigned to a combination of the button 220 among the plurality of functions assigned to the button 220. For example, the electronic device 101 may execute the function based on a contact between an external object, such as a hand of the user, and the electronic device 101, in order to minimize a motion of the user caused by a gesture pressing the combination of the button 220. It may provide convenience to users by replacing the gesture with the contact.

Hereinafter, referring to FIG. 3A, an operation in which the electronic device 101, according to an embodiment of FIG. 2, executes different functions distinguished by the sensor 230 in response to an input of pressing at least one of a plurality of buttons including the button 220 will be described.

Figure 3A:
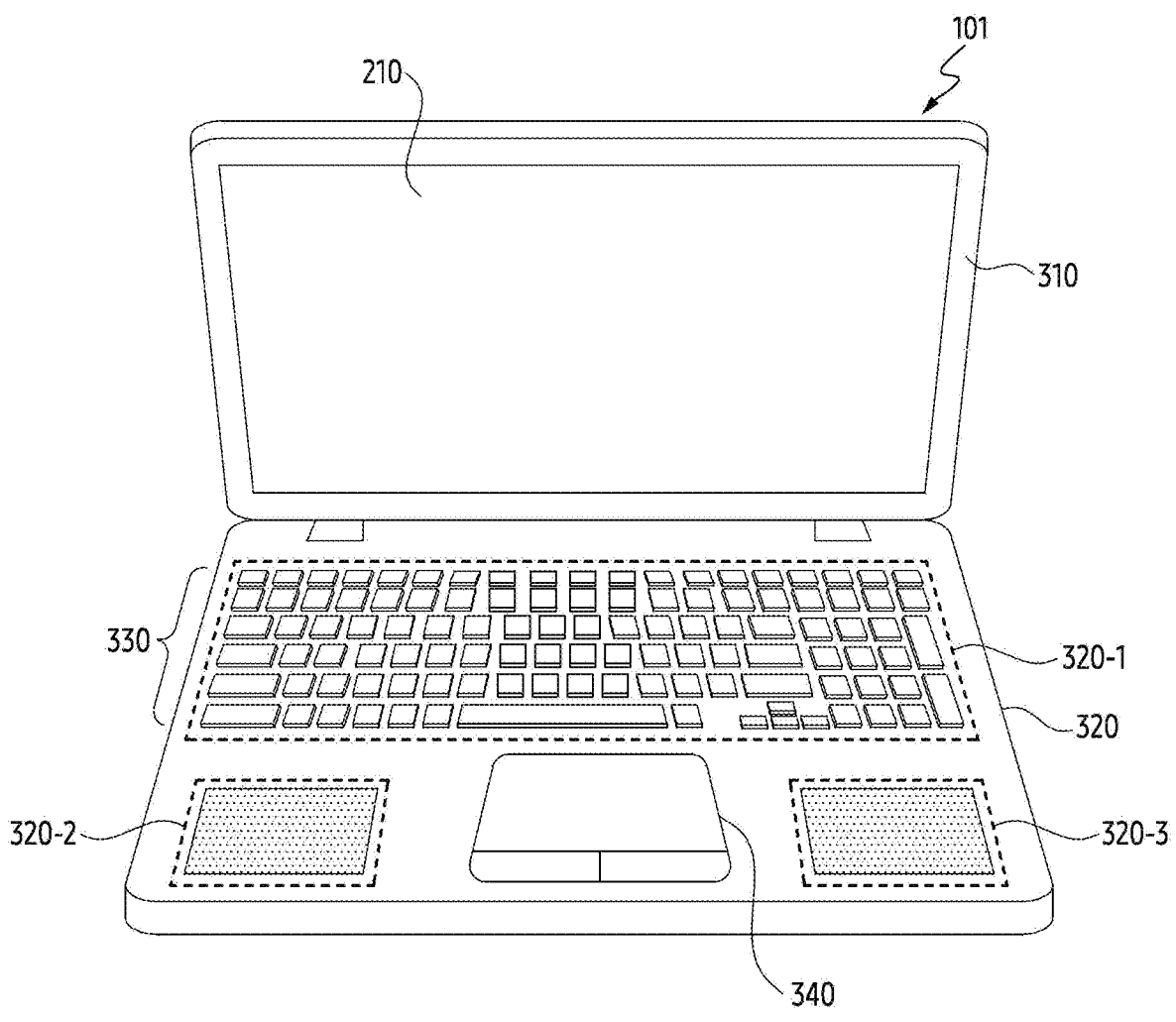
FIG. 3A illustrates an example of an electronic device according to an embodiment.

FIG. 3A illustrates an example of an electronic device according to an embodiment. An electronic device 101 of FIG. 3A may be an example of the electronic device 101 of FIG. 1 to FIG. 2. A display 210 of FIG. 3A may be an example of the display 210 of FIG. 2. Buttons 330 of FIG. 3A may include the button 220 of FIG. 2.

Referring to FIG. 3A, according to an embodiment, the electronic device 101 may include the display 210, a first housing 310, a second housing 320, the buttons 330, and/or a touch pad (or track pad) 340. The first housing 310 may include the display 210. The second housing 320 may include the buttons 330 and/or the touch pad 340. The second housing 320 may include a palm rest. The electronic device 101 may include at least one sensor (e.g., the sensor 230 of FIG. 2, the grip sensor 232 of FIG. 2, or the light sensor 234 of FIG. 2).

According to an embodiment, the electronic device 101 may include a plurality of buttons 330 in a first area 320-1 of the second housing 320. The electronic device 101 may identify that an external object has contacted on a second area 320-2 of the second housing 320. The electronic device 101 may identify that an external object has contacted on a third area 320-3 of the second housing 320. The electronic device 101 may include the touch pad 340 in the second housing 320.

According to an embodiment, a processor (e.g., the processor 120 of FIG. 2) included in the electronic device 101 may identify an external object being contacted on at least a portion of the second housing 320 based on the sensor (e.g., the sensor 230 of FIG. 2 or the grip sensor 232 of FIG. 2) included in the electronic device 101. For example, the at least a portion of the second housing 320 may include the second area 320-2 and/or the third area 320-3.

According to an embodiment, the electronic device 101 may include a first sensor for identifying an external object on the second area 320-2. According to an embodiment, the electronic device 101 may include a second sensor for identifying an external object on the third area 320-3. The first sensor may include a grip sensor (e.g., the grip sensor

232 of FIG. 2) and/or a light sensor (e.g., the light sensor 234 of FIG. 2). The second sensor may include the grip sensor (e.g., the grip sensor 232 of FIG. 2) and/or the light sensor (e.g., the light sensor 234 of FIG. 2).

According to an embodiment, the processor may identify whether an external object contacts based on a threshold value of the sensor. For example, in a case of obtaining data (e.g., capacitance) that is greater than a threshold value of the sensor, the processor may identify a contact of the external object. For example, in a case of obtaining data that is less than or equal to a threshold value of the sensor, the processor may identify a release of the contact of the external object. According to an embodiment, the processor may adjust the threshold value of the sensor. For example, the processor may adjust the threshold value by a selection of a user. For example, the threshold value may be a value for identifying an external object being contacted on the second area 320-2. For example, the threshold value may be a value for identifying an external object being contacted on the third area 320-3. However, it is not limited thereto.

According to an embodiment, the processor may adjust an area for identifying an external object by adjusting the threshold value. For example, the processor may adjust an area for identifying an external object based on a first sensor, by adjusting a threshold value of the first sensor. For example, the processor may adjust an area for identifying an external object based on a second sensor, by adjusting a threshold value of the second sensor.

According to an embodiment, the electronic device 101 may include a representation for guiding an area in which an external object on the second housing 320 is identified. For example, the representation may include a line and/or a figure for displaying a boundary of the second area 320-2 and/or the third area 320-3 formed on the housing of the electronic device 101. For example, the electronic device 101 may include a representation for guiding an area in which an external object is identified in at least a portion of the second area 320-2 in which an external object is capable of being identified based on the first sensor. For example, the electronic device 101 may include a representation for guiding an area in which an external object is identified in at least a portion of the third area 320-3 in which an external object is capable of being identified based on the second sensor. For example, the representation for guiding may be a dotted line displaying the area in which the external object is identified on the second housing 320. For example, the representation for guiding may be displaying the area in which the external object is identified on the second housing 320 in a color different from a color of the second housing 320. However, it is not limited thereto.

According to an embodiment, the processor may identify whether an external object is contacted on the second area 320-2 and/or the third area 320-3 based on a change in an electric field of a sensor included in the touch pad 340. According to an embodiment, the processor may control an operation of the touch pad 340. According to an embodiment, the processor may adjust sensitivity of the touch pad 340. As the processor adjusts the sensitivity of the touch pad 340 in the second area 320-2 and/or the third area 320-3, the processor, according to an embodiment, may cease a function of the touch pad 340 in a state identifying an external object based on the sensor.

According to an embodiment, the processor may receive an input with respect to a first button, which is at least one of the buttons 330. The processor may execute at least one of a plurality of functions assigned to the first button based on the input with respect to the first button. For example, the processor may include a sensor (e.g., the sensor 230 of FIG. 2) for identifying an external object being contacted on a partial area of the second housing 320. The partial area of the second housing 320 may include the second area 320-2 and the third area 320-3.

For example, the processor, based on an input of pressing the first button in a first state identifying an external object being contacted on the second area 320-2 based on the sensor, may execute a first function among the plurality of functions assigned to the first button. For example, the first function may be a function in which the first button operates independently. According to an embodiment, the processor may identify a second state identifying a release of the contact of the external object based on the sensor. The processor, in response to the input with respect to the first button in the second state, may execute a second function assigned to pressing the first button and a second button (e.g., one of an fn key or a shift key). For example, the fn key may have a function of adjusting volume of a sound by a combination with an f5 key. The processor, in response to a gesture of pressing the fn key and the f5 key, may execute a function of reducing the volume of the sound. For example, the shift key may have a function of outputting "!" by a combination with a 1 key. The processor, in response to a gesture of pressing the shift key and the 1 key, may execute a function of outputting "!". However, it is not limited thereto.

For example, the processor, based on the input of pressing the first button in a third state identifying an external object being contacted on the third area 320-3 based on the sensor, may execute the first function among the plurality of functions assigned to the first button. The processor, based on the input of pressing the first button in a fourth state identifying a release of the contact of the external object on the third area 320-3, may execute a third function. For example, the third function may include a function assigned to a combination of the first button and a third button different from the second button.

According to an embodiment, the processor may execute the same function in the second state and the fourth state. For example, the processor, in response to the input with respect to the first button in the second state, may execute the second function. For example, the processor, in response to the input with respect to the first button in the fourth state, may execute the second function. For example, the second function may be a function assigned to a combination of the first button having an independent function and the second button lacking an independent function.

According to an embodiment, the processor, based on identifying a release of a contact of an external object on the second area 320-2 and the third area 320-3, may cease execution of a function assigned to the buttons 330.

As described above, the electronic device 101 according to an embodiment may be used in a state in which the contact of the external object is maintained on the second housing 320. The electronic device 101 may enhance user convenience by executing a function assigned to the combination of the first button and the second button based on the input with respect to the first button in the second state in which the contact of the external object is released on the second housing 320.

Figure 3B:
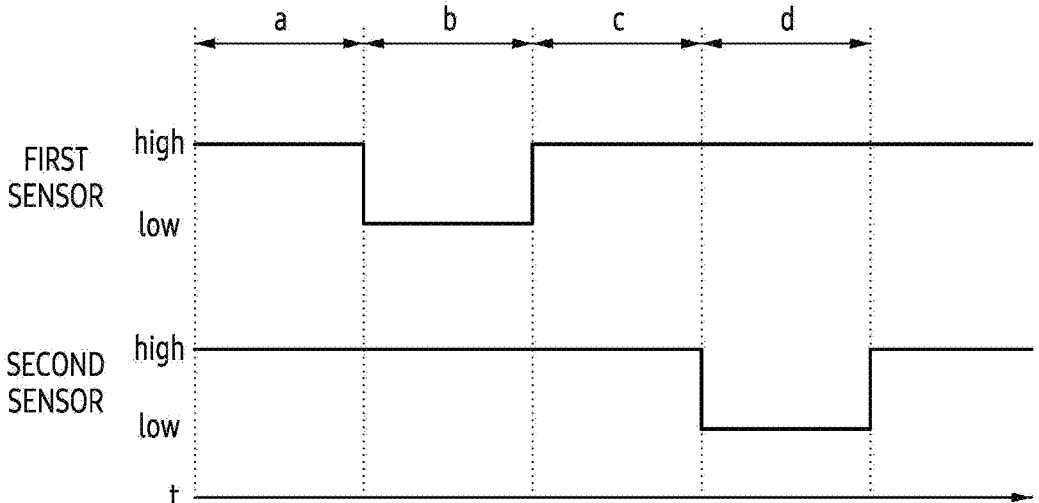
FIG. 3B illustrates an example of a timing diagram of an electronic device according to an embodiment.

FIG. 3B illustrates an example of a timing diagram of an electronic device according to an embodiment. The electronic device of FIG. 3B may be an example of the electronic device 101 of FIG. 1 to FIG. 3A. A processor of FIG. 3B may be an example of the processor 120 of FIG. 1 to FIG. 2 and/or the processor of FIG. 3A.

Referring to FIG. 3B, a first sensor (e.g., the sensor 230 of FIG. 2 or the grip sensor 232 of FIG. 2) according to an embodiment may transmit a high signal and/or a low signal. According to an embodiment, the first sensor may identify at least a portion of a housing. For example, the first sensor may transmit the high signal to the processor while identifying a contact of an external object. For example, in a section "a", the processor may identify a first state identifying the contact of the external object based on the high signal transmitted from the first sensor. For example, the first state may include a state identifying the contact of the external object based on the first sensor and a second sensor.

According to an embodiment, the first sensor may transmit the low signal. For example, the first sensor may transmit the low signal to the processor while identifying a release of the contact of the external object. For example, in a section "b", the processor may identify the second state identifying the release of the contact of the external object based on the low signal transmitted from the first sensor. For example, the second state may include a state identifying the release of the contact of the external object based on the first sensor and identifying the contact of the external object based on the second sensor.

According to an embodiment, the second sensor (e.g., the sensor 230 of FIG. 2 or the grip sensor 232 of FIG. 2) may transmit a high signal and/or a low signal. According to an embodiment, the second sensor may identify at least a portion of the housing, which is different from a portion identified by the first sensor. For example, the second sensor may transmit the high signal to the processor while identifying the contact of the external object. For example, in a section "c", the processor may identify a third state identifying the contact of the external object based on the high signal transmitted from the second sensor. For example, the third state may include a state identifying the contact of the external object based on the first sensor and identifying the contact of the external object based on the second sensor. The third state may include substantially the same state as the first state.

According to an embodiment, the second sensor may transmit the low signal to the processor while identifying the release of the contact of the external object. For example, in a section "d", the processor may identify a fourth state identifying the release of the contact of the external object based on the low signal transmitted from the second sensor. The fourth state may include a state identifying the contact of the external object based on the first sensor and identifying the release of the contact of the external object based on the second sensor.

According to an embodiment, the processor, in response to an input with respect to a button (e.g., the button 220 of FIG. 2) in various states identified based on the first sensor and the second sensor, may execute different functions.

As described above, according to an embodiment, the electronic device, in a different state, may enhance the convenience of a user of the electronic device by executing a function mapped to the different state.

Figure 4A:
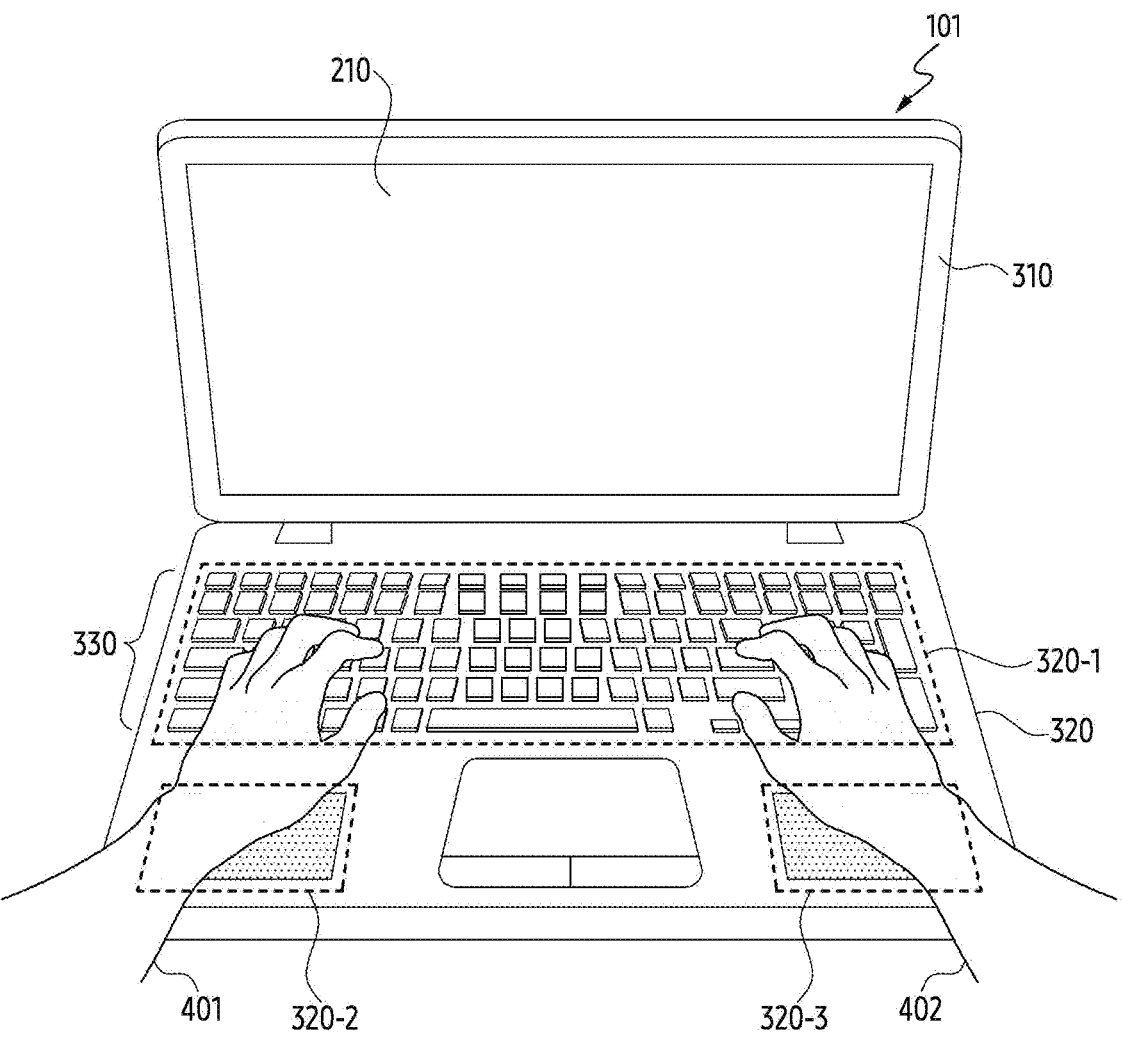
FIGS. 4A, 4B, and 4C illustrate an example of a state of use of an electronic device according to an embodiment.
Figure 4B:
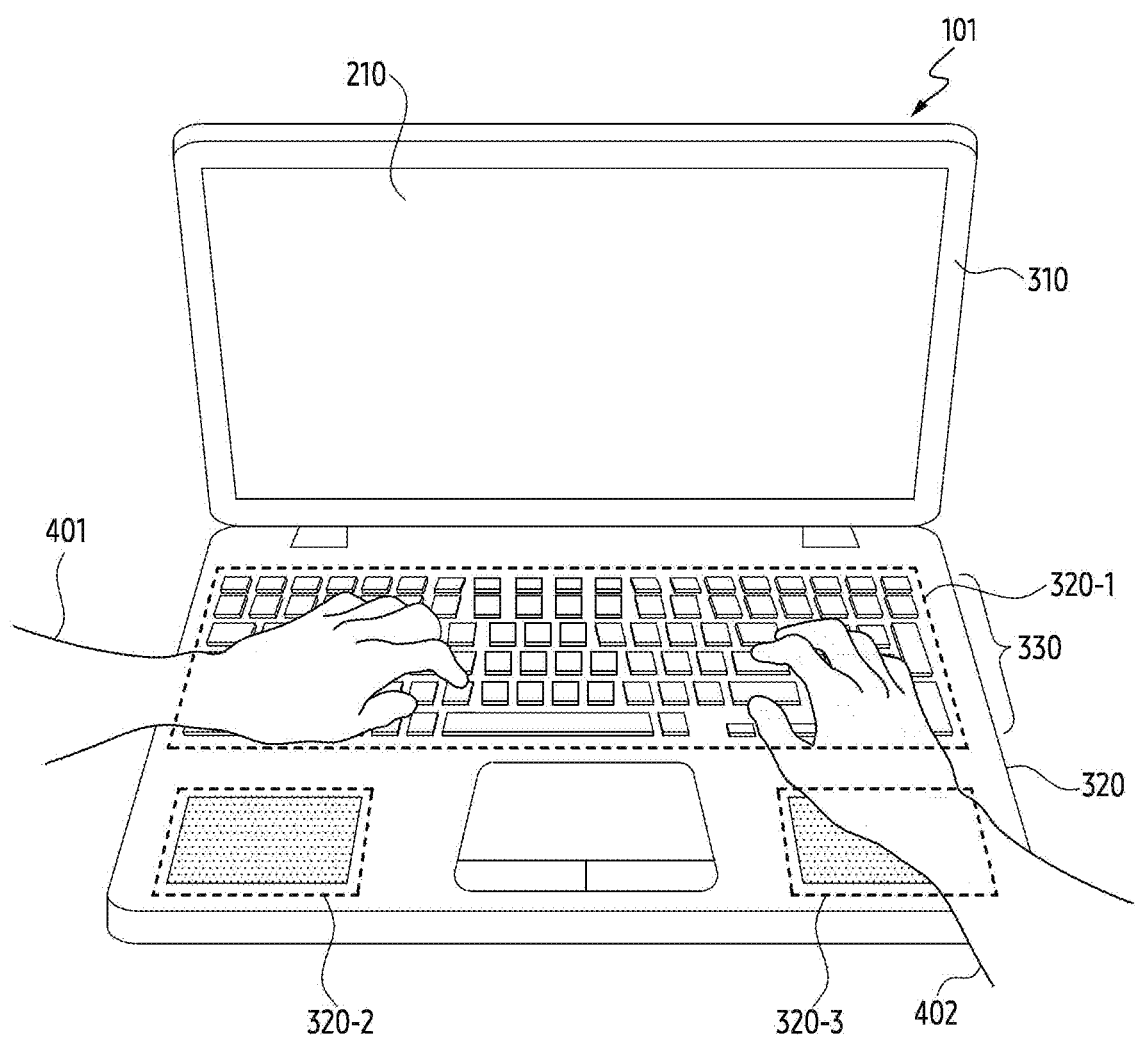
Figure 4C:
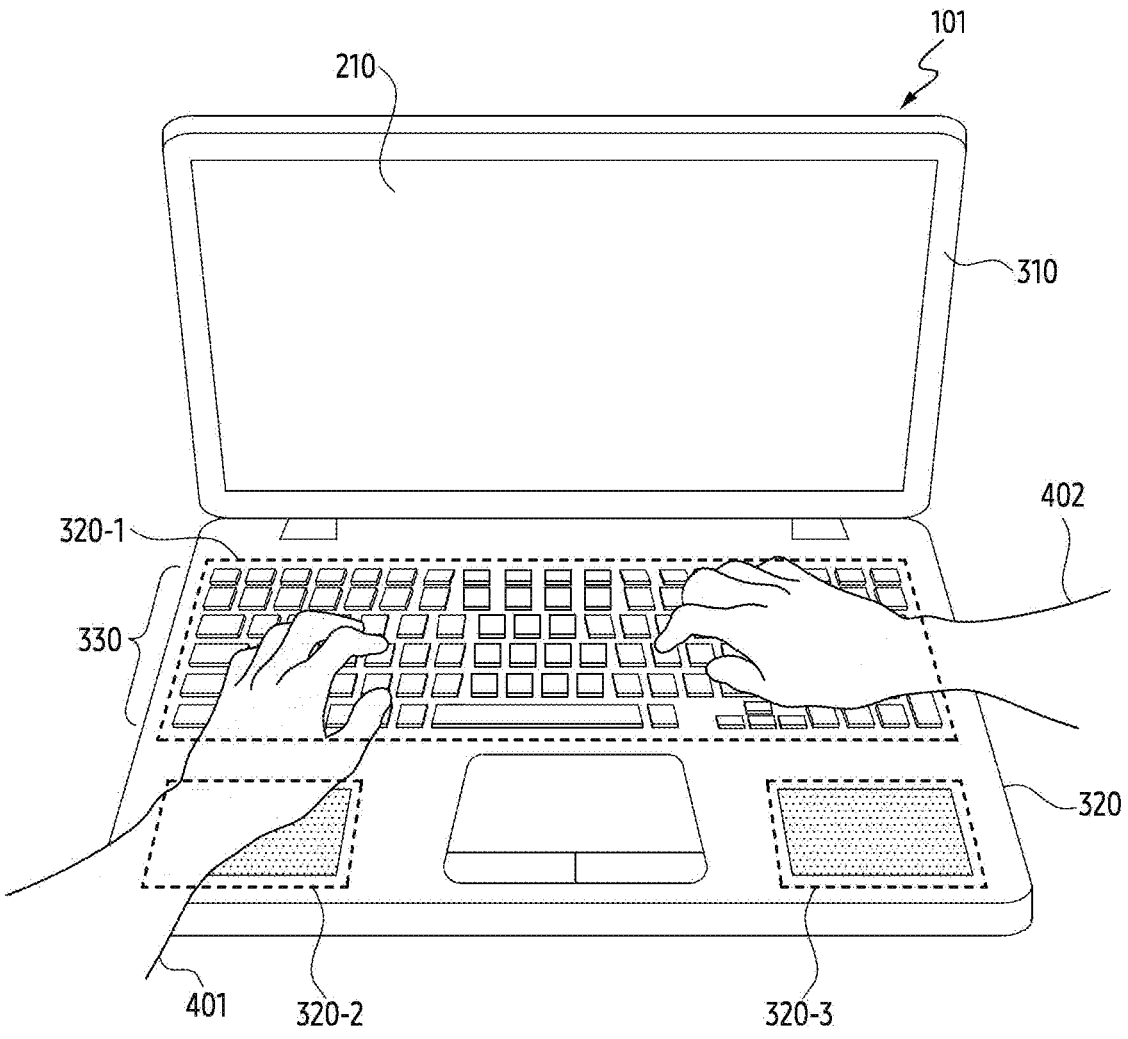

FIGS. 4A to 4C illustrate an example of a state of use of an electronic device according to an embodiment. An electronic device 101 of FIG. 4A to FIG. 4C may be an example of the electronic device 101 of FIG. 1 to FIG. 3A and/or the electronic device of FIG. 3B. A display 210 of FIG. 4A to FIG. 4C may be an example of the display 210 of FIG. 2 to FIG. 3A. A first housing 310 of FIG. 4A to FIG. 4C may be an example of the first housing 310 of FIG. 3A. A second housing 320 of FIG. 4A to FIG. 4C may be an example of the second housing 320 of FIG. 3A. Buttons 330 of FIG. 4A to FIG. 4C may include the button 220 of FIG. 2. The buttons 330 of FIG. 4A to FIG. 4C may be an example of the buttons 330 of FIG. 3A.

Referring to FIGS. 4A to 4C, according to an embodiment, the electronic device 101 may include a processor (e.g., the processor 120 of FIG. 2). The electronic device 101 may include a sensor (e.g., the sensor 230 of FIG. 2). For example, the sensor may include a grip sensor (e.g., the grip sensor 232 of FIG. 2) and/or a light sensor (e.g., the light sensor 234 of FIG. 2).

Referring to FIG. 4A, the electronic device according to an embodiment may include a plurality of buttons in a first area 320-1. The processor may receive an input with respect to the buttons 330 from an external object 400 (e.g., a hand of a user). The processor may execute a function assigned to a first button based on an input of pressing the first button, which is one of the buttons 330. The input may indicate a gesture of pressing at least one of the buttons 330. The processor may receive (or identify) an input indicating pressing at least one of the buttons 330. The processor may execute a function mapped to at least one of the buttons 330 based on detecting the input of pressing at least one of the buttons 330.

According to an embodiment, the processor may identify the external object 400 based on a sensor disposed in the second housing 320. The processor may execute functions assigned to the input of pressing the first button based on identifying the external object 400 based on a first sensor and/or a second sensor disposed in the second housing 320. For example, FIG. 4A may include an exemplary state identifying the external object 400 based on the first sensor and the second sensor.

According to an embodiment, the processor may identify a first state in which an external object 401 is in contact on a second area 320-2 of the second housing 320 based on the first sensor. The processor, in response to an input with respect to the first button in the first state, may execute a first function among a plurality of functions assigned to the first button. The first function may include a function indicated on the first button. For example, the first function may include a signal for outputting i based on an input of pressing an i key.

Referring to FIG. 4B, the processor according to an embodiment may identify a second state identifying a release of a contact of the external object 401 based on the first sensor. The processor, in response to the input with respect to the first button in the second state, may execute a second function included in the plurality of functions. The second function may be a function assigned to a combination of a second button different from the first button and the first button. For example, the second button may include a key that is not capable of independently executing an operation. For example, the second button may include an fn key (function key), a shift key, a control key, and/or an alt key. For example, the processor, based on an input with respect to the i key in the second state, may execute a function (e.g., a function of inputting a capital letter I) corresponding to a gesture of pressing both the shift key and the i key. For example, the second button may include an additional key designated by an operating system. For example, a command key, an option key, a window key, a hiper key, an altGr key, a meta key, and/or a super key may be included. However, it is not limited thereto.

According to an embodiment, the electronic device, in response to an input indicating pressing of the first button among a plurality of buttons 330 by using whether the external object 401 is identified based on the first sensor, may execute a function assigned to the combination of the first button of the plurality of buttons 330 and the second button different from the first button.

Referring again to FIG. 4A, the processor according to an embodiment may identify a third state identifying a contact of the external object 402 based on the second sensor. The processor, in response to an input with respect to the first button in the third state, may execute the first function among the plurality of functions. For example, the processor, based on the first sensor and the second sensor, may identify the external object 400 in contact with the second area and the third area. The processor, in response to a pressing input of the first button in the third state, may execute the first function among a plurality of functions assigned to the first button.

Referring to FIG. 4C, the processor according to an embodiment may identify a fourth state identifying a release of the contact of the external object 402 based on the second sensor. The processor, in response to the input with respect to the first button in the third state, may execute a third function included in the plurality of functions. The third function may be a function assigned to a combination of a third button different from the first button and the second button, and the first button. For example, the third button may include a key that is not capable of independently executing an operation. The third button may include the fn key, the shift key, the control key, and/or the alt key.

According to an embodiment, the electronic device, in response to an input indicating pressing of the first button among the plurality of buttons 330 by using whether the external object 402 is identified based on the second sensor, may execute a function assigned to the combination of the first button among the plurality of buttons 330 and the third button different from the first button.

Referring to FIG. 4B to FIG. 4C, the processor may designate the second button and/or the third button. For example, the processor may designate the second button as the shift key and designate the third button as the fn key.

As described above, the electronic device 101 according to an embodiment may provide convenience to a user of the electronic device 101 by executing a different function assigned to the buttons 330 according to whether the external object 400 on the second housing 320 is identified.

Figure 5:
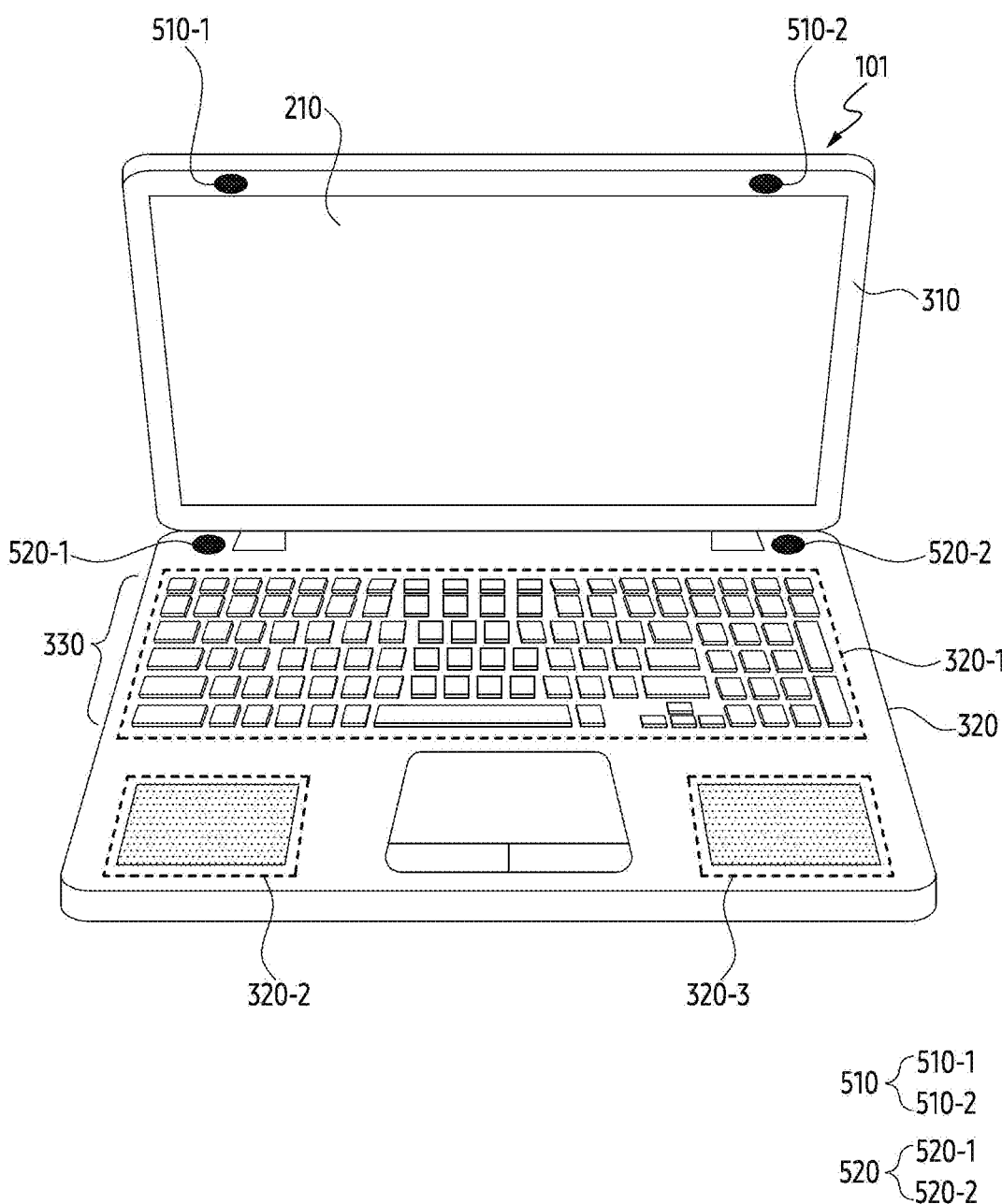
FIG. 5 illustrates an example of an electronic device including an LED according to an embodiment.

FIG. 5 illustrates an example of an electronic device including an LED according to an embodiment. An electronic device 101 of FIG. 5 may be an example of the electronic device 101 of FIG. 1 to FIG. 4C. A processor of FIG. 5 may be an example of the processor 120 of FIG. 1 to FIG. 2 and/or the processor of FIG. 3A to FIG. 4C. A display 210 of FIG. 5 may be an example of the display 210 of FIG. 2 to FIG. 4C. A first housing 310 of FIG. 5 may be an example of the second housing 320 of FIG. 3A and/or the first housing 310 of FIG. 4A to FIG. 4C. A second housing 320 of FIG. 5 may be an example of the second housing 320 of FIG. 3A and/or the second housing 320 of FIG. 4A to FIG. 4C. Buttons 330 of FIG. 5 may include the button 220 of FIG. 2. The buttons 330 of FIG. 5 may be an example of the buttons 330 of FIG. 3A and/or the buttons 330 of FIG. 4A to FIG. 4C.

Referring to FIG. 5, the electronic device 101 according to an embodiment may include LEDs 510 disposed in the first housing 310 and/or LEDs 520 disposed in the second housing 320. The processor (e.g., the processor 120 of FIG. 2), in a state based on a sensor (e.g., the sensor 230 of FIG. 2), may control the LEDs 510 and/or the LEDs 520. The LEDs 510 and/or the LEDs 520 may indicate a state in which an external object (e.g., the external object 400 of FIG. 4A) is identified based on the sensor. According to an embodiment, the electronic device 101 may include at least one of the LEDs 510 and the LEDs 520.

According to an embodiment, the processor may identify a contact of an external object on a second area 320-2 and/or a third area 320-3. For example, the processor may include a first sensor for identifying the external object on the second area 320-2. The processor may include a second sensor for identifying the external object on the third area 320-3. The first sensor may include a grip sensor (e.g., the grip sensor 232 of FIG. 2) and/or a light sensor (e.g., the light sensor 234 of FIG. 2). The second sensor may include the grip sensor (e.g., the grip sensor 232 of FIG. 2) and/or the light sensor (e.g., the light sensor 234 of FIG. 2).

According to an embodiment, the processor may identify the contact of the external object on the second area 320-2 based on the first sensor. The processor may activate at least one of the LEDs 510 and/or the LEDs 520 based on the contact of the external object on the second area 320-2. For example, the processor may activate an LED 510-1 based on the contact of the external object on the second area 320-2. For example, the processor may activate an LED 520-1 based on identifying the contact of the external object on the second area 320-2.

According to an embodiment, the processor may identify a release of the external object on the second area 320-2 based on the first sensor. The processor may deactivate at least one of the LEDs 510 and/or the LEDs 520 based on identifying the release of the contact of the external object on the second area 320-2. For example, the processor may deactivate the LED 510-1 based on the release of the external object on the second area 320-2. For example, the processor may deactivate the LED 520-1 based on identifying the release of the contact of the external object on the second area 320-2.

According to an embodiment, the processor may identify the contact of the external object on the third area 320-3 based on the second sensor. The processor may activate at least one of the LEDs 510 and/or the LEDs 520 based on the contact of the external object on the third area 320-3. For example, the processor may activate an LED 510-2 based on the contact of the external object on the third area 320-3. For example, the processor may activate an LED 520-2 based on identifying the contact of the external object on the third area 320-3.

According to an embodiment, the processor may identify a release of the external object on the third area 320-3 based on the second sensor. The processor may deactivate at least one of the LEDs 510 and/or the LEDs 520 based on identifying the release of the contact of the external object on the third area 320-3. For example, the processor may deactivate the LED 510-2 based on the release of the external object on the third area 320-3. For example, the processor may deactivate the LED 520-2 based on the release of the contact of the external object on the third area 320-3.

According to an embodiment, the processor, in a state identifying the external object based on the first sensor and/or the second sensor, may execute a first function among a plurality of functions assigned to the buttons 330. The processor, in a state identifying the release of the external object based on the first sensor and/or the second sensor, may execute a second function and/or a third function included in the plurality of functions assigned to the buttons 330. The processor may activate the LEDs 510 and/or the LEDs 520 while executing the first function. The processor may deactivate at least one of the LEDs 510 and/or the LEDs 520 while executing the second function. The processor may deactivate at least one of the LEDs 510 and/or the LEDs 520 while executing the third function. According to an embodiment, the electronic device may include one of the LEDs 510 and the LEDs 520.

As described above, the electronic device 101 according to an embodiment may more accurately feed back to a user that a function by a combination of the plurality of buttons is executed, by including an LED for indicating whether an external object is identified while identifying the external object based on the first sensor and/or the second sensor.

Figure 6:
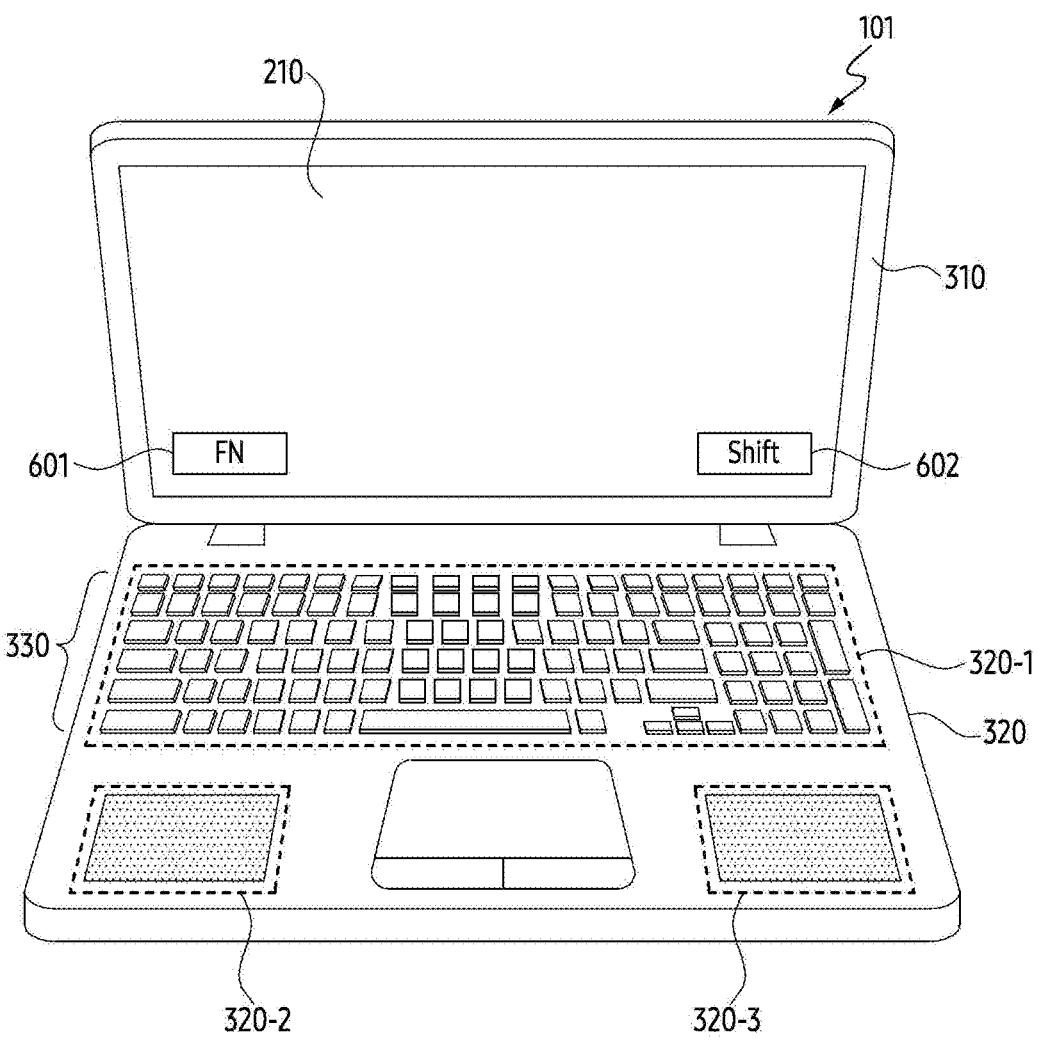
FIG. 6 illustrates an example of a screen displayed on a display of an electronic device according to an embodiment.

FIG. 6 illustrates an example of a screen displayed on a display of an electronic device according to an embodiment. An electronic device 101 of FIG. 6 may be an example of the electronic device 101 of FIG. 1 to FIG. 3A, the electronic device of FIG. 3B, and/or the electronic device 101 of FIG. 4A to FIG. 5. A processor of FIG. 6 may be an example of the processor 120 of FIG. 1 to FIG. 2 and/or the processor of FIG. 3A to FIG. 5. A display 210 of FIG. 6 may be an example of the display module 160 of FIG. 1, the display 210 of FIG. 2 to FIG. 3A, and/or the display 210 of FIG. 5. A first housing 310 of FIG. 6 may be an example of the first housing 310 of FIG. 3A and/or the first housing 310 of FIG. 4A to FIG. 5. A second housing 320 of FIG. 6 may be an example of the second housing 320 of FIG. 3A and/or second housing 320 of FIG. 4A to FIG. 5. Buttons 330 of FIG. 6 may include the button 220 of FIG. 2. The buttons 330 of FIG. 6 may be an example of the buttons 330 of FIG. 3A and/or the buttons 330 of FIG. 4A to FIG. 5.

Referring to FIG. 6, the electronic device 101 according to an embodiment may include the processor (e.g., the processor 120 of FIG. 2), a sensor (e.g., the sensor 230 of FIG. 2), the display 210, the first housing 310, the second housing 320, and/or the buttons 330. The sensor may include a grip sensor (e.g., the grip sensor 232 of FIG. 2) and/or a light sensor (e.g., the light sensor 234 of FIG. 2). The electronic device 101 may include a first sensor for identifying a contact of an external object (e.g., the external object 401 of FIG. 4A) on a second area 320-2. The electronic device 101 may include a second sensor for identifying a contact of an external object (e.g., the external object 402 of FIG. 4A) on a third area 320-3. The first sensor may include the grip sensor and/or the light sensor. The second sensor may include the grip sensor and/or the light sensor.

According to an embodiment, the display 210 may be included in a first area of the first housing 310. The display 210 may be controlled based on the processor. The display 210 may display a pop-up for indicating whether an external object is identified based on a sensor. The display 210 may display pop-ups 600 for indicating a function of one of the buttons 330.

According to an embodiment, the processor may transmit information to display a screen for indicating a second button to which an independent function is not assigned, among the buttons 330. The processor may transmit information to display a screen for indicating a third button to which an independent function is not assigned, among the buttons 330. For example, the second button may include an fn key and/or a shift key. For example, the third button may include the fn key and/or the shift key. The second button may be designated as substantially the same button as the third button.

According to an embodiment, the processor may transmit information for displaying the pop-ups 600 based on the first sensor and the second sensor. For example, the processor may transmit information for displaying a pop-up 601 based on identifying a release of the contact of the external object based on the first sensor. The display 210 may display the pop-up 601 based on a reception of the information for displaying the pop-up 601. For example, the processor may transmit information for displaying a pop-up 602 to the display based on identifying a release of the contact of the external object based on the second sensor. The display 210 may display the pop-up 602 based on a reception of the information for displaying the pop-up 602.

According to an embodiment, the processor may transmit the information for displaying the pop-ups 600 to the display 210. The display 210 may display the pop-ups 600 based on receiving the information for displaying the pop-ups 600.

According to an embodiment, the processor may transmit information for indicating the contact of the external object based on the first sensor and/or the second sensor, by adjusting a color and/or a tone of the pop-ups 600. According to an embodiment, the display 210 may display the pop-ups 600 based on the information transmitted from the processor.

According to an embodiment, the processor may transmit information for displaying the pop-up 601 darkly while the external object is identified based on the first sensor. For example, the information for displaying the pop-up 601 darkly may be information for adjusting brightness, transparency such as an alpha value, and/or saturation of the pop-up 601 to less than a specified value. For example, the processor may transmit information for displaying the pop-up 601 brightly while identifying the release of the external object based on the first sensor. For example, the information for displaying the pop-up 601 brightly may be information for adjusting brightness and/or saturation of the pop-up 601 to the specified value or more. The display 210 may adjust and display a color of the pop-up 601 based on the information.

According to an embodiment, the processor may transmit information for displaying the pop-up 602 darkly while the external object is identified based on the second sensor. For example, the information for displaying the pop-up 602 darkly may be information for adjusting brightness, and/or saturation of the pop-up 602 to less than a specified value. For example, the processor may transmit information for displaying the pop-up 602 brightly while identifying the release of the external object based on the second sensor. For example, the information for displaying the pop-up 602 brightly may be information for adjusting brightness and/or saturation of the pop-up 602 to the specified value or more. The display 210 may adjust and display a color of the pop-up 602 based on the information.

As described above, the electronic device 101 according to an embodiment may more accurately feed back to a user that a function by a combination of a plurality of buttons is executed, by displaying an executing function assigned to a button on the display 210 based on the first sensor and/or the second sensor.

Figure 7A:
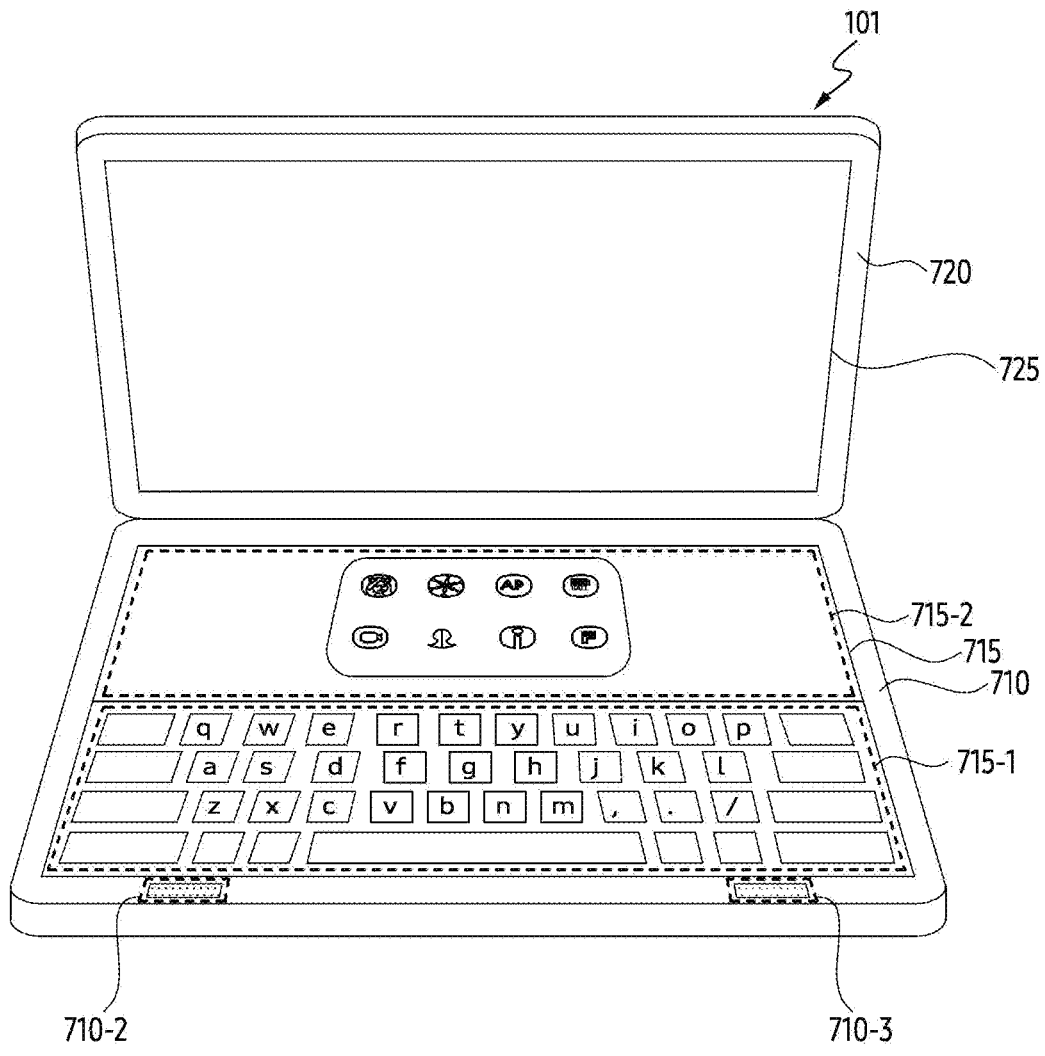
FIGS. 7A, 7B, and 7C illustrate an example of a state of an electronic device according to an embodiment.
Figure 7B:
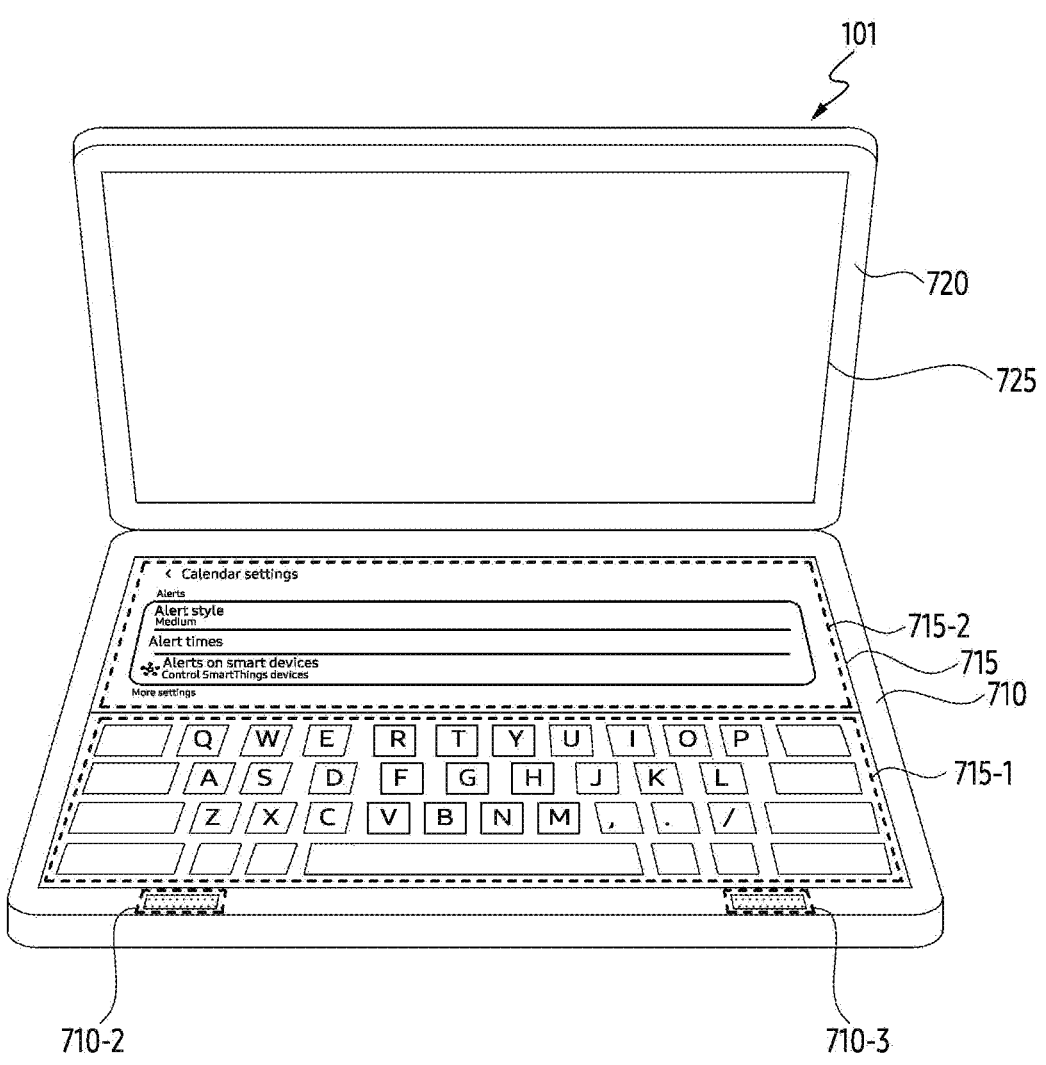
Figure 7C:
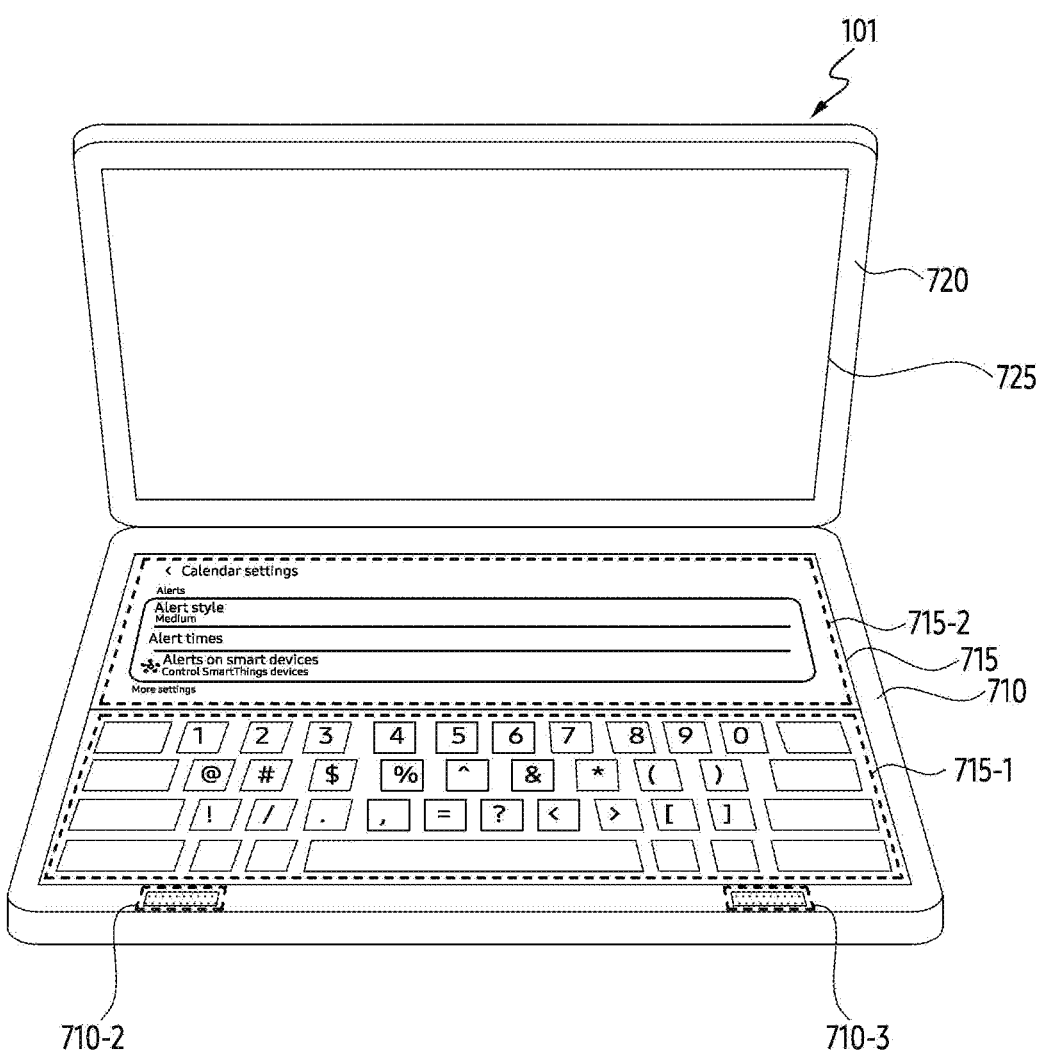

FIGS. 7A to 7C illustrate an example of a state of an electronic device according to an embodiment. An electronic device 101 of FIG. 7A to FIG. 7C may be an example of the electronic device 101 of FIG. 1 to FIG. 3A, the electronic device of FIG. 3B, and/or the electronic device 101 of FIG. 4A to FIG. 6. A processor of FIG. 7A to FIG. 7C may be an example of the processor 120 of FIG. 1 to FIG. 2 and/or the processor of FIG. 3A to FIG. 6. A first display 715 of FIG. 7A to FIG. 7C may be an example of the display module 160 of FIG. 1, the display 210 of FIG. 2 to FIG. 3A, and/or the display 210 of FIG. 4A to FIG. 7C. A second display 725 of FIG. 7A to FIG. 7C may be an example of the display module 160 of FIG. 1, the display 210 of FIG. 2 to FIG. 3A, and/or the display 210 of FIG. 4A to FIG. 7C.

Referring to FIGS. 7A to 7C, the electronic device 101 according to an embodiment may include the processor (e.g., the processor 120 of FIG. 2), the first display 715, the second display 725, a first sensor (e.g., the sensor 230 of FIG. 2), and/or a second sensor (e.g., the sensor 230 of FIG. 2).

According to an embodiment, the electronic device 101 may include the first display 715 disposed in a first housing 710. The electronic device 101 may include the second display 725 disposed in a second housing 720. The displays 715 and 725 may include a touch screen panel. For example, the displays 715 and 725 may display various applications capable of executing instructions stored in memory (e.g., the memory 130 of FIG. 2). For example, the processor may perform a display for indicating an application in at least a partial area 715-2 of the first display 715. The displays 715 and 725 may receive a touch gesture through a body (e.g., a finger) of a user or a detectable input means (e.g., a stylus pen). For example, the displays 715 and 725 may be implemented in a resistive method, a capacitive method, an infrared method, and/or an acoustic wave method.

According to an embodiment, the first display 715 and the second display 725 may be referred to as at least one flexible display. The flexible display may operate in a foldable manner. In case that the first display 715 and the second display 725 are replaced with the flexible display, the flexible display may include a first area matching the first display 715, a second area matching the second display 725, and a hinge area between the first area and the second area.

According to an embodiment, the processor may control the displays 715 and 725 based on the touch gesture inputted to the displays 715 and 725. For example, the processor may select a soft key displayed on the displays 715 and 725 in response to the touch gesture. For example, the processor may execute an application displayed on the displays 715 and 725 in response to the touch gesture. The touch gesture may not be limited to a direct contact between the displays 715 and 725 and the body of the user or a touchable input means, and may include a non-contact (e.g., a detectable distance between the displays 715 and 725 and the body of the user and/or the touchable input means is less than or equal to a specified distance). The detectable distance may be changed according to a structure of the electronic device 101. However, it is not limited thereto.

According to an embodiment, the electronic device 101 may include the first sensor for identifying an external object on a second area 710-2 of the first housing 710. The first sensor may include a grip sensor (e.g., the grip sensor 232 of FIG. 2) and/or a light sensor (e.g., the light sensor 234 of FIG. 2). According to an embodiment, the electronic device 101 may include the second sensor for identifying an external object on a third area 710-3 of the first housing 710. The second sensor may include the grip sensor and/or the light sensor. However, it is not limited thereto.

According to an embodiment, the electronic device 101 may display a keyboard (e.g., a soft keyboard, a screen keyboard, and/or a virtual keyboard) in a first area 715-1 of the first display 715. The keyboard may display a plurality of buttons. The processor may identify the external object on the second area 710-2 and the third area 710-3 based on the first sensor and the second sensor. The processor, in a first state identifying the external object on the second area 710-2 and the third area 710-3, may display a keyboard. For example, the first state may be a state identifying the external object on the second area 710-2 and the third area 710-3 by the first sensor and the second sensor. In the first state, the processor may display a keyboard on the first area 715-1 of the first display 715. The keyboard may be displayed in a first mode. For example, the first mode may be a mode displaying English lowercase letters and/or Korean consonants and vowels. However, it is not limited thereto.

According to an embodiment, the processor may receive an input with respect to a first button among a plurality of buttons included in the keyboard. The processor may identify a state identifying the external object being contacted on the second area 710-2 of the first housing 710 based on the first sensor and/or the second sensor. The processor, in response to receiving the input with respect to the first button in the state identifying the external object being contacted on the second area 710-2, may execute a first function among a plurality of functions assigned to the first button. For example, the first function may include a function of outputting a button displayed on the first display 715.

According to an embodiment, the processor may identify a state identifying a release of the external object based on the first sensor. The processor, in response to receiving the input with respect to the first button in the state identifying the release of the external object, may execute a second function assigned to a combination of the first button and a second button. For example, the second button may include a shift key, a control key, and/or an alt key. The second button may be designated by the user.

According to an embodiment, the processor may identify a state identifying the external object being contacted on the third area 710-3. The processor, in response to the input with respect to the first button in the state identifying the external object being contacted on the third area 710-3, may execute the first function.

According to an embodiment, the processor may identify a state identifying a release of the contact of the external object on the third area 710-3. The processor, in response to the input with respect to the first button in the state identifying the release of the contact of the external object on the third area 710-3, may execute a third function assigned to a combination of a third button different from the second button and the first button.

According to an embodiment, the electronic device 101 may include an acceleration sensor. For example, the acceleration sensor may be included to identify an angle between the first housing 710 of the electronic device 101 and the ground. For example, the processor may identify that the angle between the first housing 710 and the ground is within a specified range based on the acceleration sensor. The processor may display a keyboard on the first display 715 based on the angle between the first housing 710 and the ground being within a first range. The first range may include a range of a parallel angle between the first housing 710 and the ground.

According to an embodiment, the processor may identify an angle between the second housing 720 and the ground. For example, the processor may identify that the angle between the second housing 720 and the ground is within a specified range based on the acceleration sensor. The processor may display a keyboard on the second display 725 based on the angle between the second housing 720 and the ground being within a second range. The second range may include a range of a parallel angle between the second housing 720 and the ground.

Referring to FIG. 7B, the electronic device 101 according to an embodiment may display a keyboard of a second mode different from the first mode on the first area 715-1 of the first display 715. According to an embodiment, the processor may identify an external object based on the first sensor and/or the second sensor. For example, the processor may identify the release of the contact of the external object on the second area 710-2 based on the first sensor. The processor may change a mode of the keyboard displayed on the first display 715 based on identifying the release of the external object on the second area 710-2 based on the first sensor. For example, the processor, in a second state identifying an external object based on one of the first sensor or the second sensor, may adjust the mode of the keyboard to the second mode. For example, the second state may be a state identifying the external object based on the first sensor. In the second state, the processor may display the keyboard of the second mode on the first area 715-1 of the first display 715. The second mode may be a mode displaying English capital letters and/or Korean double consonants and vowels. However, it is not limited thereto.

According to an embodiment, the processor, in the first state and/or the second state, may display an input area in the at least a partial area 715-2 of the first display 715 to output what is inputted to a keyboard. For example, the input area may include a display for setting the Internet and a user interface. The input area may be displayed on the first display 715 and the second display 725. However, it is not limited thereto.

According to an embodiment, the processor may identify the external object being contacted on the second area 710-2, which is at least a partial area of the first housing 710, based on the first sensor. The processor may receive an input with respect to a button of the keyboard in the state identifying the external object being contacted on the second area 710-2. The processor, in response to the input with respect to the button, may execute a first function among a plurality of functions assigned to the first button, which is the button. The processor may identify the release of the external object being contacted on the second area 710-2, which is at least a partial area of the first housing 710, based on the first sensor. The processor, in response to the input with respect to the first button in the state identifying the release of the external object being contacted on the second area 710-2, may execute a second function assigned to a combination of the first button and a second button different from the first button among the plurality of functions. For example, the second button may include the shift key of the keyboard. The first state in which the first function is executed may include the state identifying the external object on the second area 710-2 and the third area 710-3 based on the first sensor and the second sensor. However, it is not limited thereto.

Referring to FIG. 7C, the electronic device 101 according to an embodiment may display a keyboard of a third mode different from the second mode on the first area 715-1 of the first display 715. According to an embodiment, the processor may identify a third state identifying an external object based on a sensor different from a sensor for identifying the external object in the second state. For example, the processor may identify the second state identifying the external object on the second area 710-2 based on the first sensor. The processor may identify the third state identifying the external object on the third area 710-3 based on the second sensor. The processor, in the third state, may adjust the keyboard to the third mode. For example, the third mode may be a mode displaying a special symbol. For example, the third mode may be a mode indicating an emoji. However, it is not limited thereto.

As described above, the electronic device 101 according to an embodiment may provide convenience to a user who inputs to a keyboard displayed on one of the first display 715 or the second display 725, by executing a function assigned to a combination of a button based on identification of an external object.

Figure 8:
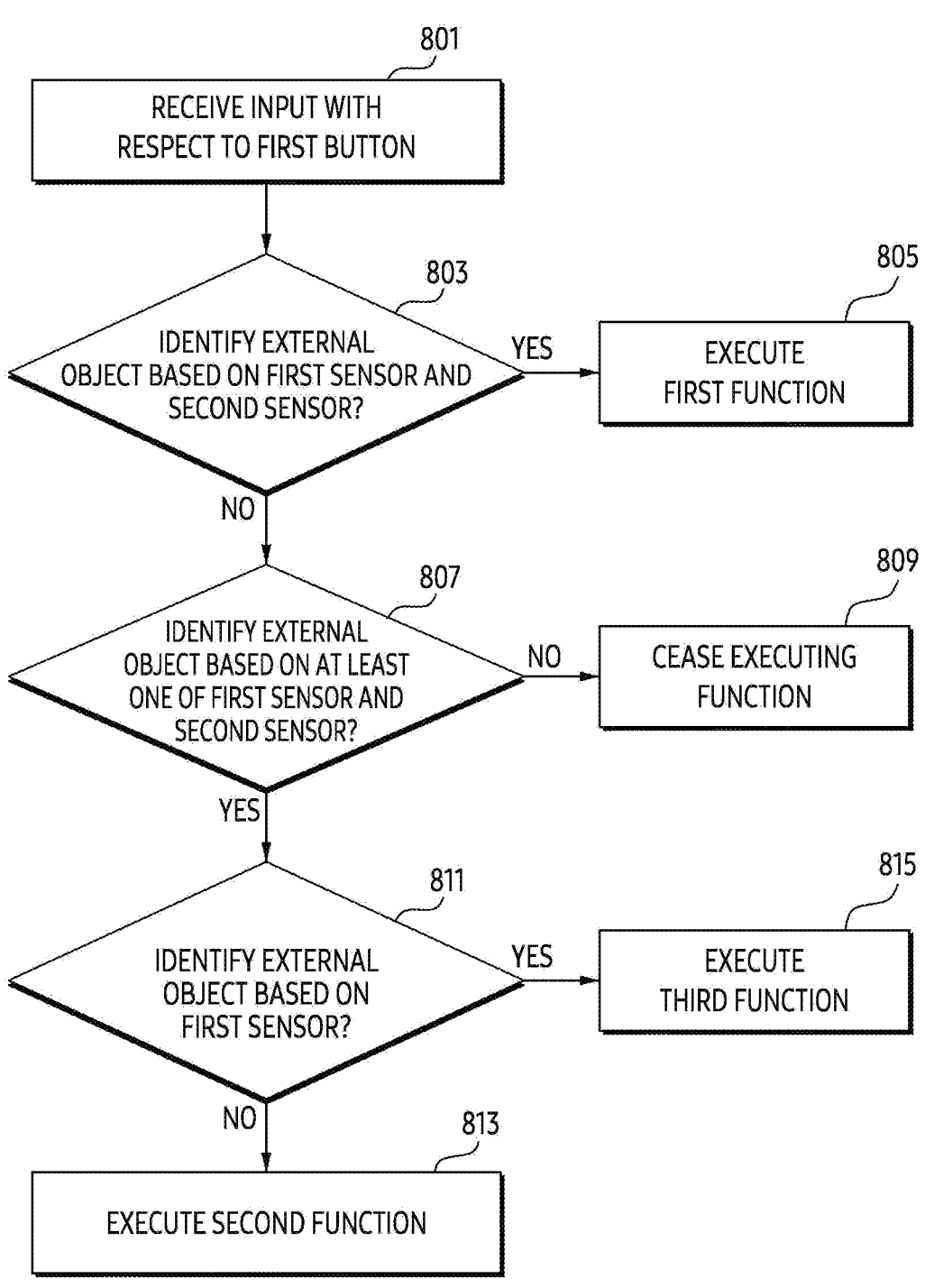
FIG. 8 illustrates an example of a flowchart of an operation of an electronic device according to an embodiment.

FIG. 8 illustrates an example of a flowchart of an operation of an electronic device according to an embodiment. The electronic device of FIG. 8 may be an example of the electronic device 101 of FIG. 1 to FIG. 3A, the electronic device of FIG. 3B, and/or the electronic device 101 of FIG. 4A to FIG. 7C. A processor of FIG. 8 may be an example of the processor 120 of FIG. 1 to FIG. 2 and/or the processor of FIG. 3A to FIG. 7C.

According to an embodiment, the electronic device may include a processor (e.g., the processor 120 of FIG. 1). According to an embodiment, the electronic device may include a display (e.g., the display module 160 of FIG. 1). According to an embodiment, the electronic device may include a sensor (e.g., the sensor 230 of FIG. 2). The sensor may be plural. According to an embodiment, the electronic device may include a housing. The housing may be plural. According to an embodiment, the electronic device may include a plurality of buttons (e.g., the button 220 of FIG. 2 and the buttons 330 of FIG. 3A).

Referring to FIG. 8, in an operation 801, the electronic device according to an embodiment may receive an input with respect to a first button. The first button may be at least one of a plurality of buttons. For example, the first button may include a button to which a function is independently assigned among the plurality of buttons. For example, the first button may include a button to which a plurality of functions are assigned.

In an operation 803, the electronic device according to an embodiment may identify an external object based on a sensor. The sensor may include a first sensor. The sensor may include a second sensor. For example, the electronic device may identify an external object based on the first sensor. The electronic device may identify a contact of an external object on a first area of the housing based on the first sensor. For example, the electronic device may identify a first state identifying the external object on the first area of the housing based on the first sensor. The electronic device may identify a release of the external object on the first area of the housing based on the first sensor. For example, the electronic device may identify a second state identifying the release of the external object on the first area of the housing based on the first sensor. For example, the electronic device, in response to an input with respect to the first button, may identify the contact of the external object on the first area of the housing based on the first sensor. For example, the electronic device, in response to the input with respect to the first button, may identify the release of the external object on the first area of the housing.

According to an embodiment, the electronic device may identify an external object based on the second sensor. The electronic device may identify a contact of an external object on a second area of the housing based on the second sensor. For example, the electronic device may identify a third state identifying the contact of the external object on the second area of the housing based on the second sensor. The electronic device may identify a release of the external object on the second area of the housing based on the second sensor. For example, the electronic device may identify a fourth state identifying the release of the external object on the second area of the housing based on the second sensor.

According to an embodiment, the electronic device may identify an external object being contacted on the housing based on the first sensor and the second sensor. For example, the electronic device may identify the external object on the first area of the housing and the second area of the housing based on the first sensor and the second sensor. For example, the electronic device, in response to the input with respect to the first button, may identify the external object on the first area and the second area on the housing based on the first sensor and the second sensor.

In case that the external object is identified based on the first sensor and the second sensor (803—Yes), in an operation 805, the electronic device according to an embodiment may execute a first function in response to the input with respect to the first button. The first function may be one of a plurality of functions assigned to the first button. According to an embodiment, the electronic device may execute the first function based on identifying the external object on the first area and the second area of the housing based on the first sensor and the second sensor. For example, the electronic device, in response to the input with respect to the first button in a state identifying the external object on the first area and the second area of the housing based on the first sensor and the second sensor, may execute the first function among the plurality of functions assigned to the first button.

In case that the external object is not identified based on the first sensor and the second sensor (803—No), in an operation 807, the electronic device according to an embodiment may identify the external object based on at least one of the first sensor and the second sensor. According to an embodiment, the electronic device may identify whether the external object is contacted on at least a partial area of the housing based on at least one of the first sensor or the second sensor.

In case that the external object is not identified based on at least one of the first sensor or the second sensor (807—No), in an operation 809, the electronic device according to an embodiment may cease executing a function. For example, the electronic device may cease executing the function of the first button. For example, the electronic device may cease receiving the input with respect to the first button.

In case that the external object is identified based on at least one of the first sensor or the second sensor (807—Yes), in an operation 811, the electronic device according to an embodiment may identify the external object based on the first sensor. For example, the electronic device may identify the external object on the first area of the housing based on the first sensor. The electronic device may identify a state identifying the contact of the external object on the first area of the housing based on the first sensor. The electronic device may identify a state identifying the release of the contact of the external object on the first area of the housing based on the first sensor.

In case that the external object is not identified based on the first sensor (811—No), in an operation 813, the electronic device according to an embodiment may execute a second function. According to an embodiment, the electronic device may identify the release of the contact of the external object on the first area of the housing based on the first sensor. The electronic device may identify the state identifying the release of the contact of the external object on the first area of the housing based on the first sensor. The electronic device may identify the contact of the external object based on the second sensor. The electronic device may identify the external object being contacted on the second area of the housing based on the second sensor. The electronic device may identify the state identifying the external object being contacted on the second area of the housing based on the second sensor.

According to an embodiment, the electronic device may identify the release of the contact of the external object on the first area of the housing based on the first sensor, and may identify the contact of the external object on the second area of the housing based on the second sensor. The electronic device may identify the release of the contact of the external object on the first area of the housing based on the first sensor, and the state identifying the contact of the external object on the second area of the housing based on the second sensor. The electronic device, in a state identifying the release of the contact of the external object on the first area of the housing based on the first sensor and the contact of the external object on the second area of the housing based on the second sensor, may execute the second function. The electronic device, in response to the input with respect to the first button based on identifying the external object being contacted on the first area and the external object being released on the second area, may execute the second function. The second function may be a function assigned to a combination of the first button and the second button. The second button may be a button to which an independent function is not assigned. For example, the second button may include an fn button, a shift button, a control button, and/or an alt button. The second button may be designated by a user of the electronic device. The processor may designate one of the fn button, the shift button, the control button, and/or the alt button as the second button.

In case that the external object is identified based on the first sensor (811—Yes), in an operation 815, the electronic device according to an embodiment may execute a third function. According to an embodiment, the electronic device may identify the contact of the external object on the first area of the housing based on the first sensor. The electronic device may identify the state identifying the contact of the external object on the first area of the housing based on the first sensor. The electronic device may identify the release of the contact of the external object based on the second sensor. The electronic device may identify the state identifying the release of the contact of the external object on the second area of the housing based on the second sensor.

According to an embodiment, the electronic device may identify the contact of the external object on the first area of the housing based on the first sensor, and may identify the release of the contact of the external object on the second area of the housing based on the second sensor. The electronic device may identify a state identifying the contact of the external object on the first area of the housing based on the first sensor and the release of the contact of the external object on the second area of the housing based on the second sensor. The electronic device, in the state identifying the contact of the external object on the first area of the housing based on the first sensor and the release of the contact of the external object on the second area of the housing based on the second sensor, may execute the third function. The electronic device, in response to the input with respect to the first button based on identifying the external object being contacted on the first area and the external object being released on the second area, may execute the third function. The third function may be a function assigned to a combination of the first button and the third button. The third button may be a button to which an independent function is not assigned. For example, the third button may include the fn button, the shift button, the control button, and/or the alt button. The third button may be designated by the user of the electronic device. The processor may designate one of the fn button, the shift button, the control button, and/or the alt button as the third button. The third button may be different from the second button.

As described above, the electronic device according to an embodiment may enhance user convenience by selecting and executing one of a plurality of functions assigned to the first button according to whether an external object being contacted on the first area or the second area is identified. The electronic device may provide convenience to the user by executing one of the plurality of functions assigned to the first button in response to the first button in a state identified based on the first sensor and/or the second sensor.

Based on a plurality of buttons included in an electronic device, a method for executing functions exceeding the number of the plurality of buttons may be required. Based on whether an external object pressing the plurality of buttons included in the electronic device is in contact with a surface of the electronic device, a method for executing a function assigned to a combination of the plurality of buttons may be required (or performed). As described above, according to an embodiment, the electronic device (e.g., the electronic device 101 of FIG. 1) may comprise a plurality of buttons (e.g., the button 220 of FIG. 2), a housing (e.g., the housing 320 of FIG. 3A) including a first area (e.g., the first area 320-1 of FIG. 3A) where the plurality of buttons are exposed to an outside, a sensor (e.g., the sensor 230 of FIG. 2) to identify an external object (e.g., the external object 400 of FIG. 4A) being contacted on a second area (e.g., the second area 320-2 of FIG. 3A) different from the first area of the housing, memory (e.g., the memory 130 of FIG. 1) to store instructions, and at least one processor (e.g., the processor 120 of FIG. 1) operably coupled to the plurality of buttons, the sensor, and the memory. The at least one processor, when the instructions are executed, may be configured to receive an input with respect to a first button among the plurality of buttons. The at least one processor, when the instructions are executed, may be configured to, in response to the input in a first state identifying the external object being contacted on the second area based on the sensor, execute a first function among a plurality of functions assigned to the first button. The at least one processor, when the instructions are executed, may be configured to, in response to the input in a second state, that is different from the first state, identifying a release of the external object based on the sensor, execute a second function included in the plurality of functions assigned to a combination of the first button and a second button different from the first button among the plurality of buttons. Based on the plurality of buttons included in the electronic device, convenience of a user of the electronic device may be enhanced, by providing a method for executing functions exceeding the number of the plurality of buttons. Based on whether an external object pressing the plurality of buttons included in the electronic device is in contact with a surface of the electronic device, the convenience of the user of the electronic device may be enhanced, by providing a method for executing a function assigned to a combination of the plurality of buttons.

For example, the electronic device may further comprise a second sensor, that is different from the sensor, which is a first sensor, to identify a contact of the external object on a third area (e.g., the third area 320-3 of FIG. 3A) different from the second area. The at least one processor, when the instructions are executed, may be configured to, in response to the input in a third state identifying the external object being contacted on the third area based on the second sensor, execute a first function among a plurality of functions assigned to the first button. The at least one processor, when the instructions are executed, may be configured to, in response to the input in a fourth state, that is different from the third state, identifying a release of the external object based on the second sensor, execute a third function included in the plurality of functions assigned to a combination of the first button, and a third button different from the second button among the plurality of buttons.

For example, the electronic device may further comprise a light emitting diode (LED) (e.g., the LED 240 of FIG. 2) positioned on at least a portion of a fourth area of the housing. The at least one processor, when the instructions are executed, may be configured to activate the LED in the first state.

For example, the at least one processor, when the instructions are executed, may be configured to deactivate the LED in the second state.

For example, the electronic device may further comprise a light emitting diode (LED) positioned on at least a portion of a fourth area of the housing, and the at least one processor, when the instructions are executed, may be configured to activate the LED in the third state.

For example, the at least one processor, when the instructions are executed, may be configured to deactivate the LED in the fourth state.

For example, the electronic device may further comprise a display. The at least one processor, when the instructions are executed, may be configured to display a pop-up to indicate execution of the second function in at least a partial area among a screen displayed through the display in the second state.

For example, the electronic device may further comprise a display. The at least one processor, when the instructions are executed, may be configured to display a pop-up to indicate execution of the third function in at least a partial area among a screen displayed through the display in the fourth state.

For example, a sensor to identify the external object may comprise a grip sensor (e.g., the grip sensor 232 of FIG. 2). The at least one processor, when the instructions are executed, may be configured to, in response to the input in the second state identifying a release of a contact of the external object based on the grip sensor, execute the second function.

For example, a sensor to identify the external object may comprise a light sensor (e.g., the light sensor 234 of FIG. 2). The at least one processor, when the instructions are executed, may be configured to, in response to the input in the second state identifying a release of a contact of the external object based on the light sensor, execute the second function.

As described above, according to an embodiment, a method of an electronic device may comprise receiving an input with respect to a first button (e.g., the button 220 of FIG. 2) among a plurality of buttons included in a first area that is exposed to an outside of a housing (e.g., the housing 320 of FIG. 3A). The method of the electronic device may comprise, in response to the input in a first state identifying an external object (e.g., the external object 400 of FIG. 4A) being contacted on a second area based on a sensor (e.g., the sensor 230 of FIG. 2) to identify the external object being contacted on the second area different from the first area of the housing, executing a first function among a plurality of functions assigned to the first button. The method of the electronic device may comprise, in response to the input in a second state, that is different from the first state, identifying a release of the external object based on the sensor, executing a second function included in the plurality of functions assigned to a combination of the first button and a second button different from the first button among the plurality of buttons.

For example, the method of the electronic device may comprise, in response to the input in a third state, based on a second sensor, that is different from the sensor, which is a first sensor, to identify a contact of the external object on a third area different from the second area, identifying the external object being contacted on the third area, executing a first function among a plurality of functions assigned to the first button. The method of the electronic device may further comprise, in response to the input in a fourth state, that is different from the third state, identifying a release of the external object based on the second sensor, executing a third function included in the plurality of functions assigned to a combination of the first button, and a third button different from the second button among the plurality of buttons.

For example, the executing the first function may further comprise activating, in the first state, a LED (e.g., the LED 240 of FIG. 2) positioned on at least a portion of a fourth area of the housing.

For example, the executing the second function may further comprise deactivating, in the second state, a LED positioned on at least a portion of a fourth area of the housing.

For example, the executing the first function may further comprise activating, in the third state, a LED positioned on at least a portion of a fourth area of the housing.

For example, the executing the third function may further comprise deactivating, in the fourth state, a LED positioned on at least a portion of a fourth area of the housing.

For example, the executing the second function may further comprise displaying a pop-up to indicate execution of the second function in at least a partial area among a screen displayed through a display in the second state.

For example, the executing the third function may further comprise displaying a pop-up to indicate execution of the third function in at least a partial area among a screen displayed through the display in the fourth state.

As described above, according to an embodiment, an electronic device (e.g., the electronic device 101 of FIG. 1) may comprise a first display (e.g., the first display 715 of FIG. 7A) included in a first housing (e.g., the first housing 710 of FIG. 7A), a second display (e.g., the second display 725 of FIG. 7A) included in a second housing (e.g., the second housing 720 of FIG. 7A) different from the first housing, a sensor (e.g., the sensor 230 of FIG. 2) to identify an external object on at least a partial area of the first housing, memory (e.g., the memory 130 of FIG. 1) to store instructions, and at least one processor operably coupled to the first display, the second display, the sensor, and the memory. The at least one processor, when the instructions are executed, may be configured to display a keyboard in a first area (e.g., the first area 710-1 of FIG. 7A) of the first display. The at least one processor, when the instructions are executed, may be configured to receive an input with respect to a first button among a plurality of buttons included in the keyboard. The at least one processor, when the instructions are executed, may be configured to, in response to the input in a first state identifying the external object being contacted on a second area (e.g., the second area 710-2 of FIG. 7A), which is at least a partial area of the housing based on the sensor, execute a first function among a plurality of functions assigned to the first button. The at least one processor, when the instructions are executed, may be configured to, in response to the input in a second state, that is different from the first state, identifying a release of the external object based on the sensor, execute a second function included in the plurality of functions assigned to a combination of the first button and a second button different from the first button among the plurality of buttons.

For example, the electronic device may further comprise a second sensor, that is different from the sensor, which is a first sensor, to identify a contact of the external object on a third area (e.g., the third area 710-3 of FIG. 7A) different from the second area. The at least one processor, when the instructions are executed, may be configured to, in response to the input in a third state identifying the external object being contacted on the third area based on the second sensor, execute a first function among a plurality of functions assigned to the first button. The at least one processor, when the instructions are executed, may be configured to, in a fourth state, that is different from the third state, identifying a release of the external object based on the second sensor, transmit information to display the keyboard displayed on the first display as a preset mode.

For example, a sensor to identify the external object may comprise a grip sensor (e.g., the grip sensor 232 of FIG. 2). The at least one processor, when the instructions are executed, may be configured to, in response to the input in the second state identifying a release of the external object on at least a partial area of the first housing, execute the second function.

For example, a sensor to identify the external object may comprise a light sensor. The at least one processor, when the instructions are executed, may be configured to, in response to the input in the second state identifying a release of the external object on at least a partial area of the first housing, execute the second function.

For example, the electronic device may further comprise an acceleration sensor. The at least one processor, when the instructions are executed, may be configured to display the keyboard in the second display based on the acceleration sensor.

As described above, according to an embodiment, a method of an electronic device may comprise displaying a keyboard in a first area (e.g., the first area 715-1 of FIG. 7A) of a display (e.g., the first display 715 of FIG. 7A) included in a housing (e.g., the first housing 710 of FIG. 7A). The method of the electronic device may comprise receiving an input with respect to a first button among a plurality of buttons included in the keyboard. The method of the electronic device may comprise, in response to the input in a first state identifying an external object being contacted on a second area (e.g., the second area 710-2 of FIG. 7A), which is at least a partial area of the housing, based on a sensor (e.g., the sensor 230 of FIG. 2) to identify the external object on the second area, executing a first function among a plurality of functions assigned to the first button. The method of the electronic device may comprise, in response to the input in a second state, that is different from the first state, identifying a release of the external object based on the sensor, executing a second function included in the plurality of functions assigned to a combination of the first button and a second button different from the first button among the plurality of buttons.

For example, the method of the electronic device may further comprise, in response to the input in a third state identifying the external object being contacted on a third area based on a second sensor, that is different from the sensor, which is a first sensor, to identify a contact of the external object on the third area different from the second area, executing a first function among a plurality of functions assigned to the first button. The method of the electronic device may further comprise, in a fourth state, that is different from the third state, identifying a release of the external object based on the second sensor, transmitting information to display the keyboard displayed on the display as a preset mode.

For example, the method of the electronic device may further comprise displaying the keyboard on a second display (e.g., the display 725 of FIG. 7A) different from the display, which is a first display, based on an acceleration sensor.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means."

What is claimed is:

1. An electronic device comprising:
a housing;
a plurality of key buttons protruded from an exterior surface of the housing to be exposed to outside of the electronic device;
a grip sensor;
memory comprising one or more storage media storing instructions; and
at least one processor comprising processing circuitry, wherein the instructions, when executed by the at least one processor individually or collectively, cause the electronic device to:
identify, via the grip sensor, whether that an external object is contacted on at least a portion of the exterior surface;
receive an input with respect to a first key button from among the key buttons;
based on the input being received while an external object is identified via the grip sensor as contacted on at least the portion of the exterior surface, execute a first function assigned to the first key button; and
based on the input being received while an external object is identified via the grip sensor as not contacted on at least the portion of the exterior surface, execute a second function assigned to a combination of the first key button and a second key button from key buttons.

2. The electronic device of claim 1, further comprising a another grip sensor, and
wherein the instructions, when executed by the at least one processor individually or collectively, cause the electronic device to:
identify, via the another grip sensor, whether that an external object is contacted on at least a portion of the exterior surface;
based on the input being received while an external object is identified via the grip sensor as contacted on at least the portion of the exterior surface and an external object is identified via the another grip sensor as contacted on at least the portion of the exterior surface, execute the first function among a plurality of functions assigned to the first key button; and
based on the input being received while an external object is identified via the grip sensor as contacted on at least the portion of the exterior surface and an external object is identified via the another grip sensor as not contacted on at least the portion of the exterior surface, execute a third function assigned to a combination of the first key button and a third key button from among the key buttons.

3. The electronic device of claim 2, further comprising a LED, and
wherein the instructions, when executed by the at least one processor individually or collectively, cause the electronic device to:
activate the LED while an external object is identified via the another grip sensor as contacted on at least the portion of the exterior surface.

4. The electronic device of claim 3,
wherein the instructions, when executed by the at least one processor individually or collectively, cause the electronic device to:
deactivate the LED while an external object is identified via the another grip sensor as not contacted on at least the portion of the exterior surface.

5. The electronic device of claim 2, further comprising a display, and
wherein the instructions, when executed by the at least one processor individually or collectively, cause the electronic device to:
display, via the display, a pop-up indicating execution of the third function while an external object is identified via the grip sensor as contacted on at least the portion of the exterior surface and an external object is identified via the another grip sensor as not contacted on at least the portion of the exterior surface.

6. The electronic device of claim 1, further comprising a light emitting diode (LED), and
wherein the instructions, when executed by the at least one processor individually or collectively, cause the electronic device to:
activate the LED while an external object is identified via the grip sensor as contacted on at least the portion of the exterior surface.

7. The electronic device of claim 6, wherein the instructions, when executed by the at least one processor individually or collectively, cause the electronic device to:

deactivate the LED while an external object is identified via the grip sensor as not contacted on at least the portion of the exterior surface.

8. The electronic device of claim 1, further comprising a display, and wherein the instructions, when executed by the at least one processor individually or collectively, cause the electronic device to:

display, via the display, a pop-up indicating execution of the second function while an external object is identified via the grip sensor as not contacted on at least the portion of the exterior surface.

9. The electronic device of claim 1, wherein the grip sensor includes a proximity sensor.

10. The electronic device of claim 1, wherein the instructions, when executed by the at least one processor individually or collectively, cause the electronic device to:

based on the input being received while an external object is identified via the grip sensor as not contacted on at least the portion of the exterior surface, even if an input is not received with respect to the second key button, execute the second function.

11. The electronic device of claim 1, wherein the instructions, when executed by the at least one processor individually or collectively, cause the electronic device to:

based on an input being concurrently received with respect to both the first key button and the second key button, execute the second function independently of whether an external object is not contacted on at least the portion of the exterior surface.

12. The electronic device of claim 1, wherein the instructions, when executed by the at least one processor individually or collectively, cause the electronic device to:

based on the input being received while an external object is identified via the grip sensor as not contacted on at least the portion of the exterior surface, recognize an external object being not contacted on at least the portion of the exterior surface as another input received with respect to the second key button; and based on the recognition, execute the second function.

13. A method executed in an electronic device comprising a housing, a plurality of key buttons protruded from an exterior surface of the housing to be exposed to outside of the electronic device, and a grip sensor, the method comprising:

identifying, via the grip sensor, whether that an external object is contacted on at least a portion of the exterior surface;

receiving an input with respect to a first key button from among the key buttons;

based on the input being received while an external object is identified via the grip sensor as contacted on at least the portion of the exterior surface, executing a first function assigned to the first key button; and based on the input being received while an external object is identified via the grip sensor as not contacted on at least the portion of the exterior surface, executing a second function assigned to a combination of the first key button and a second key button from among the key buttons.

14. The method of claim 13, wherein the electronic device further comprises another grip sensor, the method further comprising:

identify, via the another grip sensor, whether that an external object is contacted on at least a portion of the exterior surface;

based on the input being received while an external object is identified via the grip sensor as contacted on at least the portion of the exterior surface and an external object is identified via the another grip sensor as contacted on at least the portion of the exterior surface, executing the first function among a plurality of functions assigned to the first key button; and based on the input being received while an external object is identified via the grip sensor as contacted on at least the portion of the exterior surface and an external object is identified via the another grip sensor as not contacted on at least the portion of the exterior surface, executing a third function assigned to a combination of the first key button and a third key button from among the key buttons.

15. The method of claim 13, wherein the electronic device further comprises a light emitting diode (LED), wherein the method further comprises:

activating the LED while an external object is identified via the grip sensor as contacted on at least the portion of the exterior surface.

16. The method of claim 13, wherein the electronic device further comprises a LED, wherein the method further comprises:

deactivating the LED while an external object is identified via the grip sensor as not contacted on at least the portion of the exterior surface.

17. The method of claim 13, further comprising:

based on the input being received while an external object is identified via the grip sensor as not contacted on at least the portion of the exterior surface, even if an input is not received with respect to the second key button, executing the second function.

18. The method of claim 14, further comprising:

based on an input being concurrently received with respect to both the first key button and the second key button, executing the second function independently of whether an external object is not contacted on at least the portion of the exterior surface.

19. The method of claim 13, further comprising:

based on the input being received while an external object is identified via the grip sensor as not contacted on at least the portion of the exterior surface, recognizing an external object being not contacted on at least the portion of the exterior surface as another input received with respect to the second key button; and based on the recognition, executing the second function.

20. The method of claim 14, wherein the grip sensor includes a proximity.

* * * * *